United States Patent [19]
Kawazura et al.

[11] Patent Number: 5,834,552
[45] Date of Patent: Nov. 10, 1998

[54] RUBBER COMPOSITION AND PROCESS FOR PRODUCING THEREOF

[75] Inventors: Tetsuji Kawazura; Hiroyuki Kaido, both of Hiratsuka, Japan

[73] Assignee: The Yokohama Rubber Co., Ltd., Tokyo, Japan

[21] Appl. No.: 932,302

[22] Filed: Sep. 17, 1997

Related U.S. Application Data

[63] Continuation of Ser. No. 573,423, Dec. 15, 1995, abandoned.

[30] Foreign Application Priority Data

| Dec. 16, 1994 | [JP] | Japan | 6-313310 |
| Dec. 28, 1994 | [JP] | Japan | 6-328868 |
| Jan. 6, 1995 | [JP] | Japan | 7-000606 |
| Feb. 8, 1995 | [JP] | Japan | 7-020565 |
| Feb. 8, 1995 | [JP] | Japan | 7-020612 |

[51] Int. Cl.$^6$ ................................ C08J 31/04
[52] U.S. Cl. .................................. 524/526
[58] Field of Search ......................... 524/526

[56] References Cited

U.S. PATENT DOCUMENTS

| 3,326,810 | 6/1967 | Dolan et al. | 252/194 |
| 4,321,168 | 3/1982 | Ueda et al. | 524/526 |
| 4,929,679 | 5/1990 | Akita et al. | 525/194 |
| 4,940,756 | 7/1990 | Broekhuis et al. | 525/237 |
| 5,082,901 | 1/1992 | Linster | 525/237 |

FOREIGN PATENT DOCUMENTS

| 0 051 450 | 5/1982 | European Pat. Off. |
| 0 105 239 | 4/1984 | European Pat. Off. |
| 2 447 946 | 8/1980 | France |
| A-3910512 | 10/1989 | Germany |
| A-3920175 | 12/1989 | Germany |
| 55-104343 | 8/1980 | Japan |
| 61-81445 | 4/1986 | Japan |
| 61-218404 | 9/1986 | Japan |
| 4-35654 | 2/1992 | Japan |
| 4-325535 | 11/1992 | Japan |
| 6-32941 | 2/1994 | Japan |
| 6-200083 | 7/1994 | Japan |

OTHER PUBLICATIONS

"Trend of the Techniques", Yasuyoshi Kawaguchi, Journal of the Society of Automotive Engineers of Japan, vol. 43, No. 3, 1989, p. 144; pp. 8–13.

"Carbon Black Distribution in NR/Polybutadiene Blends", J.M. Massie et al., R.C.T. 66, 276–285 (1993).

"Effect of Heterogeneous Carbon Black Distribution on the Properties of Polymer Blends", A.K. Sircar et al., R.C.T. 47, 48–56 (1974).

"Elastomer Blend Properties –Influence of Carbon Black Type and Location", W.M. Hess et al., R.C.T. 50, 301–306 (1977).

"Mixing of Carbon Black with Rubber. VI. Analysis of NR/SBR Blends", George R. Cotten et al., R.C.T. 61, 609–618 (1988).

*Primary Examiner*—Peter D. Mulcahy
*Attorney, Agent, or Firm*—Finnegan, Henderson, Farabow, Garrett & Dunner, L.L.P.

[57] ABSTRACT

A process for producing a rubber composition comprising (i) a total amount of 100 parts by weight of starting rubbers (A) and (B), including 30 to 90 parts by weight of the starting rubber (A) having a glass transition temperature (Tg) of −40° to 10° C. and 10 to 40 parts by weight of the starting rubber (B) which is viscoelastically incompatible with the starting rubber (A) and has a Tg of at least 20° C. lower than the Tg of the starting rubber (A) and (ii) 60 to 100 parts by weight of a reinforcing agent, wherein the starting rubber (A) and at least 80% by weight of the total weight of the reinforcing agent are mixed in a hermetic type mixer at 130° C. to 200° C. for at least 10 seconds, then the starting rubber (B) and the remaining reinforcing agent are added and mixed.

6 Claims, 1 Drawing Sheet

RUBBER COMPOSITION AND PROCESS FOR PRODUCING THEREOF

This application is a continuation, of application Ser. No. 08/573.423, filed Dec. 15, 1995, now abandoned.

BACKGROUND OF THE INVENTION

1. Field of the Invention

The present invention relates to a process for producing a rubber composition usable for a vehicle tire tread. More specifically, it relates to a rubber composition for a vehicle tire tread which has a smaller change in the tan$\delta$ of the dynamic viscoelasticities at 0° C. and 40° C., while maintaining the breaking strength thereof.

2. Description of the Related Art

A tire having a strong grip on the road surface is required for improving safety when driving a vehicle. The grip of a tire is closely related to the tan$\delta$ of the dynamic viscoelasticity. For example, as described in "Jidosha Gijutsu (Automobile Technology)", vol. 43, No. 3, p. 8 (1989), the grip on a wet road surface (i.e., "wet property") is considered to be correlated with the tan$\delta$ at about 0° C. However, this is in the case where the temperature of the water is near room temperature. For example, when the water temperature is 60° C., it is correlated with the tan$\delta$ at about 40° C. Further, the grip on a dry road surface is considered to be correlated on an average with a tan$\delta$ of from 0° C. to 60° C. In this way, to get a tire to exhibit a stable grip in the face of ambient changes, it is required that the tan$\delta$ of a wide temperature range be high and stable. That is, it is desirable that the temperature gradient of the tan$\delta$ be small. In general, when the amount of a reinforcing agent such as carbon black or white carbon is increased, the temperature gradient of the tan$\delta$ becomes smaller, but this causes a rise in the viscosity of unvulcanized rubber and leads to problems such as a decline in the workability, a decline in the breaking strength of the vulcanized rubber, and a susceptibility to breakage, so is not desirable for a rubber for tire tread use.

For the wet property, it is desirable to increase the tan$\delta$ at 0° C. and reduce the tan$\delta$ at 40° C., that is, to increase the temperature gradient of the tan$\delta$ expressed by (tan$\delta$ at 0° C.)÷(tan$\delta$ at 40° C.). In general, if the amount of a reinforcing agent such as carbon black or white carbon is decreased, the temperature gradient of the tan$\delta$ becomes larger, but this causes a decline in the breaking strength, hardness, etc. of the vulcanized rubber, so is not desirable for a rubber for tire tread use. Therefore, many techniques have been reported for improving the wet property at a low roll resistance.

For example, Japanese Unexamined Patent Publication (Kokai) No. 61-218404 and Japanese Unexamined Patent Publication (Kokai) No. 4-325535 propose the use of white carbon and a specific carbon black for the reinforcing agent to be added to the rubber composition, Japanese Examined Patent Publication (Kokoku) No. 5-1298 proposes the use of a starting rubber with modified molecular terminals, and Japanese Unexamined Patent Publication (Kokai) No. 4-35654 proposes means for improvement from the aspect of the materials such as the addition of a dinitroso amine compound. Further, Japanese Unexamined Patent Publication (Kokai) No. 6-32941 proposes the means of improvement by tinkering with the mixing method. However, while these techniques give some effect of improvement, further improvement is desired to satisfy the performance requirements of a tire tread.

Further, Rubber Chem. Technol., vol. 47, p. 48 (1974), vol. 50, p. 301 (1977), vol. 61, p. 609 (1988), and vol. 66, p. 276 (1993) report that the impact resilience changes depending on the combination of mixture of the master batch prepared by mixing the starting rubber with the carbon black in advance and the other starting rubber. However, these studies do not elucidate at all what is involved in the effect on the temperature gradient of the tan$\delta$.

Japanese Unexamined Patent Publication (Kokai) No. 6-200083 proposes the method of vulcanizing a formulation comprised of a starting rubber having a low glass transition temperature (Tg), then adding a high Tg starting rubber, but this has the defect that the viscosity of the rubber composition is increased, so there is a tendency for burning during the processing and, also, there is the limitation that the high Tg starting rubber must form a continuous (matrix) phase, therefore it is necessary to make the high Tg rubber content at least 50% by weight, which is disadvantageous for a low roll resistance.

The rubber composition is reduced in the tan$\delta$ due to the kneading due to the promotion of the dispersion of the carbon black and the breakdown of the structure. Japanese Unexamined Patent Publication (Kokai) No. 55-104343 discloses a method of adding and mixing carbon black to 40 to 60% by weight of a starting rubber, then adding the remaining starting rubber, but since it is necessary to add a large amount of carbon black to a small amount of a starting rubber, the viscosity of the master batch becomes extremely high and there are problems in workability and also there is a limitation to a blend of BR and NR.

As explained above, it was known that the tan$\delta$ of vulcanized rubber changes by changing the method of mixing a rubber composition, but in the past the research was mostly concerned with applying that effect to the reduction of the tan$\delta$ or the increase of the temperature dependency. No attempt had been made to apply it to the reduction of the temperature dependency of the tan$\delta$.

SUMMARY OF THE INVENTION

Accordingly, the objects of the present invention are to provide a process for producing a rubber composition for a tire tread which eliminates the problems in the prior art explained above and gives a small temperature dependency of the tan$\delta$ without impairing the breaking strength and to provide the rubber compositions obtained by the same.

Another object of the present invention is to provide a process for preparing a rubber composition for a tire tread which eliminates the problems in the prior art explained above and gives an excellent wet property and low roll resistance without impairing the breaking strength and to provide rubber compositions obtained by the same.

According to the first aspect of the present invention, there are provided a process for producing a rubber composition comprising (i) a total amount of 100 parts by weight of starting rubbers (A) and (B), including 30 to 90 parts by weight of the rubber (A) having a glass transition temperature (Tg) of −40° to 10° C. and 10 to 40 parts by weight of the starting rubber which is viscoelastically incompatible with the starting rubber (A) and has a Tg of at least 20° C. lower than the Tg of the starting rubber (A) and (ii) 60 to 100 parts by weight of a reinforcing agent, wherein the starting rubber (A) and at least 80% by weight of the total weight of the reinforcing agent are mixed in a hermetic type mixer at 130° C. to 200° C. for at least 10 seconds, then the starting rubber (B) and the remaining reinforcing agent are added and mixed and also the rubber compositions obtainable therefrom.

Further, according to the first aspect of the present invention, there is provided a process for producing a rubber composition comprising a total amount of 100 parts by weight of starting rubbers (A), (B), and (C) including 30 to 90 parts by weight of the starting rubber (A) having a glass transition temperature (Tg) of −40° to 10° C., 10 to 40 parts by weight of the starting rubber (B) which is viscoelastically incompatible with the starting rubber (A) and has a Tg of at least 20° C. lower than the Tg of the starting rubber stock (A), and as an optional component of 0 to 30 parts by weight of a starting rubber (C) which has a Tg equal to or less than the Tg of the starting rubber (A) (when the starting rubber (C) is included, the preferable amount is 0 to 15 parts by weight) and 60 to 100 parts by weight of a reinforcing agent, wherein the starting rubbers (A) and (C) and at least 80% by weight of the total weight of the reinforcing agent are mixed in a hermetic type mixer at 130° C. to 200° C. for at least 10 seconds, then the starting rubber (B) and the remaining reinforcing agent are added and mixed in, and the rubber compositions obtainable therefrom.

According to the second aspect of the present invention, there is provided a process for producing a rubber composition comprising (i) a total amount of 100 parts by weight of starting rubbers (A'), (B'), and (C'), including 10 to 40 parts by weight of the starting rubber (A') having a glass transition temperature (Tg) of −40° to −15° C., 30 to 85 parts by weight of the starting rubber (B') which is viscoelastically incompatible with the starting rubber (A') and has a Tg at least 20° C. lower than the Tg of the starting rubber (A'), and 5 to 30 parts by weight of a starting rubber (C') which is viscoelastically compatible with the starting rubber (A'), incompatible with the starting rubber (B'), and has a Tg equal to or less than the Tg of the starting rubber (A'), and 30 to 60 parts by weight of a reinforcing agent, wherein the starting rubbers (B') and (C') and at least 80% by weight of the total weight of the reinforcing agent are mixed in a hermetic type mixer at 150° C. to 200° C. for at least 10 seconds, then the starting rubber (A') and the remaining reinforcing agent are added and mixed and also the rubber compositions obtainable therefrom.

According to the third aspect of the present invention, there is provided a process for producing a rubber composition comprising (i) a total amount of 100 parts by weight of starting rubbers (A"), (B"), and (C"), including 30 to 85 parts by weight of the starting rubber (A") having a glass transition temperature (Tg) of −40° to 10° C., 10 to 40 parts by weight of the starting rubber stock (B") which is viscoelastically incompatible with the starting rubber (A") and has a Tg of at least 20° C. lower than the Tg of the starting rubber (A"), and 5 to 30 parts by weight of a starting rubber (C") which is viscoelastically incompatible with the starting rubber (A"), compatible with the starting rubber (B"), and has a Tg equal to or less than the Tg of the starting rubber (A"), and 60 to 100 parts by weight of a reinforcing agent, wherein the starting rubber (A") and (C") and at least 80% by weight of the total weight of the reinforcing agent are mixed in a hermetic mixer at 130° C. to 200° C. for at least 10 seconds, then the starting rubber (B") and the remaining reinforcing agent are added and mixed, and the rubber compositions obtainable therefrom.

BRIEF EXPLANATION OF THE DRAWINGS

The present invention will now be further illustrated with reference to the accompanying drawing of FIG. 1 which is a graph showing the relationship between the temperature of a rubber composition comprising two types of starting rubber in the case of a state of viscoelastic incompatibility and the logarithmic value of the tanδ.

DESCRIPTION OF THE PREFERRED EMBODIMENTS

Figure 1:
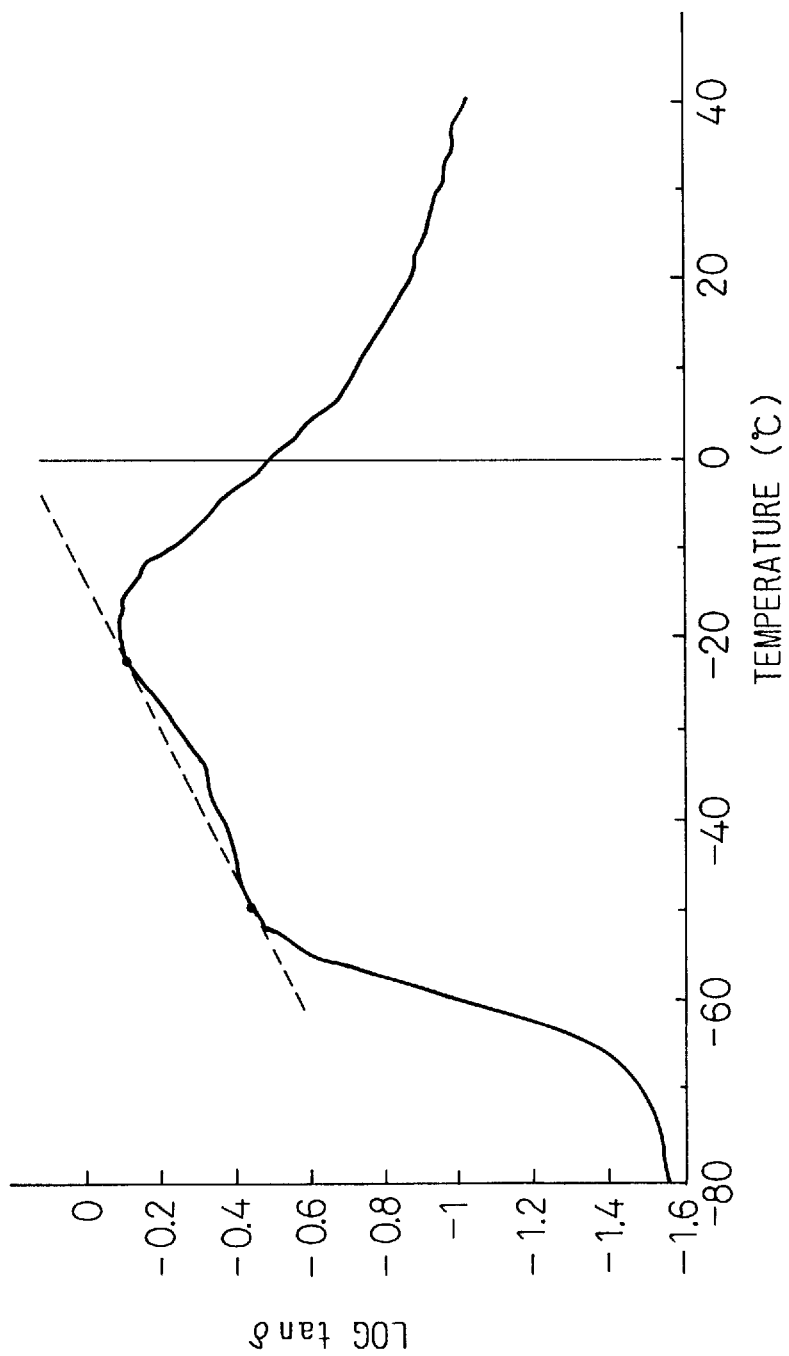

As explained above, it was known that the tanδ of vulcanized rubber changes by changing the method of mixing of a rubber composition, but the present inventors engaged in intensive studies on the selection of the materials and the effects of the method of mixing and as a result discovered that by mixing two groups of starting rubbers (A) and (B) having specific Tgs and compatibilities and a reinforcing agent in a specific order, it is possible to reduce the temperature dependence of the tanδ while maintaining the breaking strength. Further, there is the advantage that with this process, the rise in viscosity of the master batch during the mixing is small. Details will be explained below.

It is known that when mixing in advance part of the starting rubber and carbon black and then adding the remaining starting rubber, the carbon black tends to be unevenly distributed in the rubber stock and the tanδ changes. The previously cited Rubber Chem. Technol., vol. 61, p. 276 (1993) describes the effects of the method of mixing on the impact resiliences of a large number of blends. This reference does not describe anything regarding the correlation with the Tg of the rubber blends, but the present inventors noted this on their own and found that when the impact resiliences described are converted to tanδ, the tanδ becomes larger when the carbon black was made to be unevenly distributed in the high Tg starting rubber rather than distributing it homogeneously in the high Tg and low Tg starting rubbers. However, there are differences in the magnitude of the effect depending on if part of the carbon black moves between blend phases in the process of mixing and the combination of the starting rubbers. No all-encompassing interpretation could be made of the state of the temperature gradient at 0° C. and 40° C.

Therefore, the inventors measured and studied the two Tgs and the viscoelastic compatibilities in systems comprising a large number of combinations of starting rubber with the carbon black made to be unevenly distributed in the high Tg rubber component and, as a result, found that the temperature gradient of tanδ at a certain degree of unevenness of distribution of the carbon black becomes smaller the closer the Tg of the high Tg component to −200° C. when two types of starting rubbers are viscoelastically incompatible and the two Tgs are separate from each other. Accordingly, the effect is greater when the Tgs of the two types of incompatible starting rubbers are as far apart from each other as possible. The difference must be at least 20° C., preferably at least 35° C.

"Viscoelastically incompatible" as spoken of here means that, when measuring the temperature dependency of the viscoelasticity of the vulcanized rubber, the tanδ peaks exhibited by the two starting rubbers are observed to be separate. This is believed to occur when the starting rubbers in the rubber composition are not completely mixed together and are separate in layers or islands of a size of at least several tends of nanometers and are separate in Tg. More specifically, as shown in FIG. 1, it is learned that starting rubbers are viscoelastically incompatible when there are two points which are sharing a tangent on the temperature dependence curve of the tanδ when the measured values of the tanδ are expressed on a logarithmic scale with respect to the temperature axis.

The present inventors measured the viscoelasticities at 0° C. and 40° C. and measured the unevenness of distribution of the carbon black obtained by the method of assaying the starting rubber composition in the bound rubber (carbon gel) of the unvulcanized rubber described in Rubber Chem. Technol., vol. 61, p. 609 (1988) and studied the relationship between the two in detail. As a result, they learned that when looking at the effect of improvement of the temperature gradient of the tanδ expressed by (change in temperature gradient of tanδ)÷(change in unevenness of distribution of carbon black), with a Tg of the starting rubber of the high Tg component of less than −40° C., even if the carbon black is made to be distributed unevenly, there is almost no improvement in the temperature gradient of the tanδ, while when over −40° C., it gradually becomes smaller, when over −30° C. it sharply becomes smaller, and when near −10° C., becomes the best, but when over that once again becomes smaller. The reason why the effect of improvement of the temperature gradient of the tanδ becomes the best when the Tg of the starting rubber of the high Tg component is near −20° C. is not clear, but it is believed that since in general the maximum point of the tanδ curve is at the side 10° to 20° C. higher than the Tg of the starting rubber, when the maximum point of the tanδ is near the measurement point, that is, 0° C., the effect of improvement becomes greatest.

When trying to improve the temperature dependency of the tanδ by causing uneven distribution of the carbon black, however, there are various problems in terms of industrial usage, as explained below, when just mechanically selecting two types of starting rubbers having different Tgs, mixing the low Tg starting rubber and the carbon black in the initial mixing process in advance, then adding the high Tg starting rubber in a later process, so this is not enough to obtain a rubber composition suited for a tire tread.

One problem is that it is a matter of experience what kind of starting rubber to select to enable both improvement of the temperature dependency of the tanδ and incompatibility of the two groups of the starting rubbers (A) and (B). It is possible to research the compatibility of two kinds of polymers using theoretical formulas to some extent, as for example described in Macromolecule, vol. 24, p. 4839 (1991), but this is insufficient. Further, it is extremely difficult to predict whether the compatibilities can be held when using a wide range of starting rubbers as in the present invention.

The present inventors mixed large numbers of starting rubbers having different Tgs and measured their viscoelasticities so as to study if those combinations were viscoelastically compatible and, as a result, found that the selection of the starting rubbers charged in the two mixing processes from the following five combinations is desirable for achieving the object of the present invention:

1) Starting rubber (A): polybutadiene (BR) having a content of 1,2-bond butadiene in the butadiene portion of at least 65% by weight, preferably 65 to 85% by weight Starting rubber (B): BR having a cis-1,4 bond butadiene content of at least 95% by weight, preferably 97 to 99% by weight 2) Starting rubber (A): BR having a 1,2-bond butadiene content of at least 65% by weight, preferably 65 to 85% by weight, and/or emulsion polymerized SBR having a styrene content of 30 to 50% by weight, preferably 35 to 45% by weight Starting rubber (B): BR having a 1,2-bond butadiene content of 10 to 50% by weight, preferably 12 to 20% by weight 3) Starting rubber (A): emulsion polymerized SBR having a styrene content of 30 to 50% by weight, preferably 35 to 45% by weight Starting rubber (B): natural rubber (NR) and/or polyisoprene rubber (IR)

4) Starting rubber (A): solution polymerized SBR having a 1,2-bond butadiene content of at least 70% by weight, preferably 70 to 85% by weight, and a styrene content of not more than 30% by weight, preferably 10 to 20% by weight Starting rubber (B): solution polymerized SBR having a 1,2-bond butadiene content of not more than 40% by weight, preferably 5 to 20% by weight, and a styrene content shown by the following formula (1), emulsion polymerized SBR having a styrene content of not more than 35% by weight, preferably 20 to 35% by weight, BR having a cis-1,4 bond butadiene content of at least 95% by weight, preferably 97 to 99% by weight, and/or BR having a 1,2-bond butadiene content of 10 to 50% by weight, preferably 12 to 20% by weight Styrene content <40-(1,2-bond butadiene content)÷3    (1)

5) Starting rubber (A): solution polymerized SBR having a 1,2-bond butadiene content of at least 70% by weight, preferably 10 to 70% by weight, and a styrene content of the value shown by the following formula (2)

Starting rubber (B): solution polymerized SBR having a 1,2-bond butadiene content of not more than 40% by weight, preferably 5 to 20% by weight, and a styrene content shown by the following formula (1), BR having a cis-1,4 bond butadiene content of at least 95% by weight, preferably 97 to 99% by weight, BR having a 1,2-bond butadiene content of 10 to 50% by weight, preferably 12 to 20% by weight, NR, and/or IR Styrene content <40-(1,2-bond butadiene content)÷3    (1)

Styrene content >40-(1,2-bond butadiene content)÷3    (2)

In all of these five preferable combinations, the following is essential: That is, the starting rubber (A) must have a Tg of −40° C. to 10° C. and be present in an amount of 30 to 90 parts by weight, preferably 50 to 75 parts by weight. When the Tg is less than −40° C., there is little effect of improvement of the temperature gradient of the tanδ, while when over 10° C., the rubber hardness becomes higher and the rubber is not practical for a tire tread. When the amount of formulation is over 90 parts by weight, there is a poor effect of improvement of the temperature gradient of the tanδ, while when less than 30 parts by weight, the viscosity of the master batch becomes higher and the workability is poor.

The starting rubber (B) must be viscoelastically incompatible with the starting rubber (A), have a Tg at least 20° C., preferably 35° to 60° C., lower than the Tg of the starting rubber (A), and be present in an amount of 10 to 40 parts by weight, preferably 15 to 30 parts by weight. When compatible with the starting rubber (A), there is no uneven distribution of the reinforcing agent, while when the temperature difference of the Tg is smaller than 20° C., no effect of improvement of the temperature dependency of the tanδ can be expected. When less than 10 parts by weight, the effect of improvement of the temperature dependency becomes poor, while when over 40 parts by weight, the workability becomes poor.

The rubber composition (C) has a detrimental effect on improvement of the temperature gradient of the tanδ, so the amount is preferably as small as possible (0 part by weight). The minimum necessary amount should be used for adjusting the workability and the physical properties. The rubber stock (C) is required to be a rubber stock having a Tg equal to or less than the Tg of the starting rubber (A) and be present in an amount of 0 to 30 parts by weight. It is not particularly limited in viscoelastic compatibility and is selected from general use rubbers such as NR, IR, SBR, BR, isoprene-isobutyrene copolymer rubber, and ethylene-propylene-diene copolymer rubber. When the Tg is higher than the A group or with more than 30 parts by weight, the effect of improvement of the temperature gradient of the tanδ is reduced.

Another problem in the case of premixing a low Tg starting rubber (B) and carbon black and then mixing the high Tg starting rubber is that sometimes the carbon black partially moves to the high Tg component, that is, the starting rubber (A), added later during the mixing, so there is insufficient unevenness of distribution. The effect of improvement of the temperature gradient of the tanδ at this time is reduced. The reason is sometimes that there is insufficient bonding between the carbon black and the molecules of the starting rubber in the initial mixing process and sometimes that the later added starting rubber has a higher affinity with the carbon black.

As confirmed by the amount of the bound rubber produced, the bonds between the carbon black and the starting rubber molecules become stronger due to the heat of the mixing, so it is preferable to mix them at a high temperature. To bring out the effect of the present invention, the mixing is performed at 130° to 200° C., preferably 150° to 190° C., for at least 10 seconds, preferably 10 to 60 seconds. When the mixing temperature is less than 130° C., the bonding is insufficient, while when over 200° C., there is deterioration due to the heat, so the strength of the vulcanized rubber drops remarkably. By mixing by a hermetic type mixer, the temperature rises along with the mixing time and therefore the mixing temperature is not constant, but when a predetermined temperature is reached, the bonding between the starting rubber and the carbon black is completed in a short time of about 10 seconds. That is, as the initial mixing process, it is sufficient to hold the starting rubber (A) and the optional component starting rubber (C) and reinforcing agent in the hermetic type mixer at the necessary temperature range for as little as 10 seconds. Then the starting rubber (B) and remaining reinforcing agent may be mixed by additionally charging them in the mixer after the initial mixing process or alternatively may be mixed in a hermetic type mixer or open roll using a master batch obtained by discharging and cooling the initial mixture from the mixer.

The affinity of the starting rubber with the reinforcing agent differs depending on the type of the starting rubber. For example, NR, IR, and BR have a higher affinity with a reinforcing agent than SBR due to the large number of double bonds in the molecules. The most effective is the introduction of a functional group called "terminal modification". "Terminal modification", as for example described in Japanese Unexamined Patent Publication (Kokai) No. 64-60604, is an operation for causing a reaction of the alkali metal or alkali earth metal of the synthesis terminals of the starting rubber molecules with a compound having a —CO—N< or —CS—N< bond such as N-methyl-2-pyrrolidone. The effect is greater the higher the rate of modification of the synthesis terminals. Use is usually made of a starting rubber with a rate of modification of at least 20%. The terminal modified rubber stock is believed to bond on a priority basis at the surface of the carbon black. Accordingly, when the affinity of the starting rubber (A) with the reinforcing agent is high, there is little fear of the reinforcing agent moving to the starting rubber (B) additionally added, but in the converse case, unless the temperature of the initial mixing process is raised to ensure sufficient achievement of a bound rubber, the effect of the present invention sometimes will not be sufficiently exhibited. In this way, the present invention becomes more effective by the use of a terminal modified rubber as the rubber stock (A).

The reinforcing agent is generally carbon black, but even when white carbon, a similar selection of rubber stocks and method of mixing as with carbon black may be used. In the case of white carbon (silica), however, generally joint use is made of a silane coupling agent. Such a formulation, however, requires that the white carbon be mixed together at the initial mixing process for improvement of the dispersion and wear resistance. The amount of the reinforcing agent is preferably 60 to 100 parts by weight. When the amount is less than 60 parts by weight, the temperature dependency of the tanδ becomes poorer, while conversely when over 100 parts by weight, the workability and the breaking strength fall. Further, when mixing the starting rubbers (A) and (C), it is necessary to mix at least 80% of the total amount of the reinforcing agent. The larger the amount of the remaining reinforcing agent mixed in with the starting rubber (B), the less the effect of improvement of the temperature gradient of the tanδ.

The rubber composition of the present invention may have further blended into it in addition to the starting rubbers of the components (A) and (B) and the optional component (C) and the essential component of the reinforcing agent, various types of additives which are generally mixed into rubber compositions for tires such as sulfur, a vulcanization accelerator, antioxidant, filler, softening agent, or plasticizer. The amounts and methods of mixture of these additives are not particularly limited and may be made the general amounts and methods.

According to the second aspect of the present invention, the present inventors found that by mixing three groups of the starting rubbers (A'), (B'), and (C') having specific Tgs and compatibilities and a reinforcing agent in a specific order, it is possible to increase the temperature dependence of the tanδ while maintaining the breaking strength. Further, there is the advantage that with this process, the rise in viscosity of the master batch during the mixing is small. Details will be explained below.

It is known that when mixing in advance part of the starting rubber and carbon black and then adding the remaining starting rubber, the carbon black tends to be unevenly distributed in the starting rubber and the tanδ changes. The previously cited Rubber Chem. Technol., vol. 61, p. 276 (1993) describes the effects of the method of mixing on the impact resiliences of a large number of blends. This reference does not describe anything regarding the correlation with the Tg of the rubber blends, but the present inventors noted this on their own and found that when the impact resiliences described are converted to tanδ, the tanδ becomes lower when the carbon black was made to be unevenly distributed in the low Tg starting rubber rather than distributing it homogeneously in the high Tg and low Tg starting rubbers. However, there are differences in the magnitude of the effect depending on if part of the carbon black moves between blend phases in the process of mixing and the combination of the starting rubbers. No all-encompassing interpretation could be made of the state of the temperature gradient at 0° C. and 40° C.

Therefore, the inventors measured and studied the two Tgs and the viscoelastic compatibilities in systems comprising a large number of combinations of starting rubber and, as a result, found that the temperature gradient of tanδ at a certain degree of unevenness of distribution of the carbon black becomes larger the closer the Tg of the high Tg component to −20° C. when two types of starting rubbers are viscoelastically incompatible and the two Tgs are separate from each other. Accordingly, the effect is greater when the Tgs of the two types of incompatible starting rubbers are as far apart from each other as possible. The difference must be at least 20° C., preferably at least 35° C.

"Viscoelastically incompatible" as spoken of here means that, when measuring the temperature dependency of the viscoelasticity of the vulcanized rubber, the tanδ peaks exhibited by the two starting rubbers are observed to be separate. This is believed to occur when the starting rubbers in the rubber composition are not completely mixed together and are separate in layers or islands of a size of at least several tends of nanometers and are separate in Tg. More specifically, as shown in FIG. 1, it is learned that rubber stocks are viscoelastically incompatible when there are two points which are sharing a tangent on the temperature dependence curve of the tanδ when the measured values of the tanδ are expressed on a logarithmic scale with respect to the temperature axis.

The present inventors measured the viscoelasticities at 0° C. and 40° C. and measured the unevenness of distribution of the carbon black obtained by the method of assaying the starting rubber stock composition in the bound rubber (carbon gel) of the unvulcanized rubber described in Rubber Chem. Technol., vol. 61, p. 609 (1988) and studied the relationship between the two in detail. As a result, they learned that, when looking at the effect of improvement of the temperature gradient of the tanδ expressed by (change in temperature gradient of tanδ)÷(change in unevenness of distribution of carbon black), with a Tg of the rubber stock of the high Tg component of less than −40° C., even if the carbon black is made to be distributed unevenly, there is almost no improvement in the temperature gradient of the tanδ, while when over −40° C., it gradually becomes smaller, when over −30° C. it sharply becomes smaller, and when near −10° C., becomes the best, but when over that once again becomes smaller. The reason why the effect of improvement of the temperature gradient of the tanδ becomes the best when the Tg of the rubber stock of the high Tg component is near −20° C. is not clear, but it is believed that since in general the maximum point of the tanδ curve is at the side 10° to 20° C. higher than the Tg of the starting rubber, when the maximum point of the tanδ is near the measurement point, that is, 0° C., the effect of improvement becomes greatest.

When trying to improve the temperature dependency of the tanδ by causing uneven distribution of the carbon black, however, there are various problems in terms of industrial usage, as explained below, when just mechanically selecting two types of starting rubbers with different Tgs, mixing the low Tg starting rubber and the carbon black in the initial mixing process in advance, then adding the high Tg starting rubber in a later process, so this is not enough to obtain a rubber composition suited for a tire tread.

One problem is that even when adding and mixing additional starting rubber to a master batch obtained by mixing a starting rubber and reinforcing agent in advance, the latter starting rubber will not disperse well. Since starting rubbers inherently are hard to mix with each other, they are viscoelastically incompatible, but since one of the starting rubbers is bonded with the filler and forms a partially three-dimensional structure, mixing becomes even harder. Therefore, even if steps such as increasing the mixing time are taken, the breaking strength and wear resistance of the vulcanized rubber drop. Accordingly, the present inventors discovered the possibility of avoiding this problem by mixing in advance into the starting rubber of the master batch a small amount of a starting rubber easy to mix with the starting rubber to be additionally added and not impairing the shape of the peak of the tanδ.

However, it is probably a matter of experience what kind of starting rubber to select to enable both improvement of the temperature dependency of the tanδ and dispersion of the starting rubber (A'). It is possible to research the compatibility of two kinds of polymers using theoretical formulas to some extent, as for example described in Macromolecule, vol. 24, p. 4839 (1991), but this is insufficient. Further, it is extremely difficult to predict whether the viscoelastic incompatibilities can be held using three groups of starting rubbers (A'), (B'), and (C') as in the present invention.

The present inventors mixed large numbers of starting rubbers with different Tgs and measured their viscoelasticities so as to study when those combinations were viscoelastically compatible and, as a result, found that if the starting rubber charged in the initial mixing process is the starting rubbers (B') and (C') and the starting rubber charged in the additional mixing process is the starting rubber (A'), selection from among the following four combinations is preferable for achieving the object of the present invention:

1) Starting rubber (A'): emulsion polymerized SBR having a styrene content of 30 to 50% by weight, preferably 35 to 45% by weight, and/or solution polymerized SBR having a 1,2-bond butadiene content in the butadiene component of not more than 70% by weight, preferably 10 to 70% by weight, and a styrene content of the value shown by the following formula (1')

$$\text{Styrene content} > 40 - (1,2\text{-bond butadiene content}) \div 3 \quad (1')$$

Starting rubber (B'): NR and/or IR

Starting rubber (C'): emulsion polymerized SBR having a styrene content of not more than 50% by weight, preferably 35 to 45% by weight, and/or a solution polymerized SBR having a 1,2-bond butadiene content of not more than 70% by weight, preferably 10 to 70% by weight, and a styrene content of at least 15% by weight, preferably 20 to 40% by weight 2) Starting rubber (A'): BR having a 1,2-bond butadiene content of at least 65% by weight, preferably 65 to 85% by weight, and/or a solution polymerized SBR having a 1,2-bond butadiene content of at least 70% by weight, preferably 70 to 85% by weight, and a styrene content of not more than 30% by weight, preferably 5 to 20% by weight Starting rubber (B'): emulsion polymerized SBR having a styrene content of not more than 35% by weight, preferably 20 to 30% by weight, and/or solution polymerized SBR having a 1,2-bond butadiene content of not more than 40% by weight, preferably 5 to 20% by weight, and a styrene content of the value shown by the following formula (2')

$$\text{Styrene content} < 40 - (1,2\text{-bond butadiene content}) \div 3 \quad (2')$$

Starting rubber (C'): BR having a 1,2-bond butadiene content of at least 65%, preferably 65 to 85% by weight, solution polymerized SBR having a 1,2-bond butadiene content of at least 70% by weight, preferably 10 to 70% by weight, and a styrene content of not more than 30% by weight, preferably 5 to 20% by weight, and/or NR, and/or IR 3) Starting rubber (A'): BR having a 1,2-bond butadiene content of at least 65% by weight, preferably 64 to 85% by weight, emulsion polymerized SBR having a styrene content of 30 to 50% by weight, preferably 35 to 45% by weight, solution polymerized SBR having a 1,2-bond butadiene content of at least 70% by weight, preferably 70 to 85% by weight, and a styrene content of not more than 30% by weight, preferably 5 to 20% by weight, and/or solution polymerized SBR having a 1,2-bond butadiene content of not more than 70% by weight, preferably 10 to 70% by weight, and a styrene content of the value shown by the following formula (1')

Styrene content >40−(1,2-bond butadiene content)÷3  (1')

Starting rubber (B'): BR having a cis-1,4 bond butadiene content of at least 95% by weight, preferably 97 to 99% by weight, and/or a BR having a 1,2-bond butadiene content of 10 to 50% by weight, preferably 12 to 20% by weight Starting rubber (C'): BR having a 1,2-bond butadiene content of at least 65% by weight, preferably 65 to 85% by weight, emulsion polymerized SBR having a styrene content of not more than 50% by weight, preferably 35 to 45% by weight, solution polymerized SBR having a 1,2-bond butadiene content of at least 70% by weight, preferably 70 to 85% by weight, and a styrene content of not more than 30%, preferably 10 to 20% by weight, and/or solution polymerized SBR having a 1,2-bond butadiene content of not more than 70% by weight, preferably 10 to 70% by weight, and a styrene content of the value shown by the following formula (1').

Styrene content >40−(1,2-bond butadiene content)÷3  (1')

4) Starting rubber (A'): BR having a 1,2-bond butadiene content of at least 65% by weight, preferably 65 to 85% by weight Starting rubber (B'): BR having a cis-1,4 bond butadiene content of at least 95% by weight, preferably 97 to 99% by weight, and/or BR having a 1,2-bond butadiene content of 10 to 50% by weight, preferably 12 to 20% by weight Starting rubber (C'): BR having a 1,2-bond butadiene content of at least 65% by weight, preferably 65 to 85% by weight, and/or NR, and/or IR.

In all of these four preferable combinations, the following is essential: That is, the starting rubber (A') must have a Tg of −40° C. to −15° C. and be present in an amount of 10 to 40 parts by weight, preferably 15 to 30 parts by weight. When the Tg is less than −40° C., there is little effect of improvement of the temperature gradient of the tanδ, while when over −15° C., the rubber hardness near 0° C. becomes higher and the rubber is not practical for a tire tread. When the amount of formulation is less than 10 parts by weight, there is a poor effect of improvement of the temperature gradient of the tanδ, while when over 40 parts by weight, the viscosity of the master batch becomes higher and the workability is poor.

The starting rubber (B') must be viscoelastically incompatible with the starting rubber (A'), have a Tg at least 20° C., preferably 35° to 60° C., lower than the Tg of the starting rubber (A'), and be present in an amount of 30 to 85 parts by weight, preferably 50 to 75 parts by weight. When compatible with the starting rubber (A'), there is no uneven distribution of the reinforcing agent, while when the temperature difference of the Tg is smaller than 20° C., no effect of improvement of the temperature dependency of the tanδ can be expected. When less than 30 parts by weight, the workability becomes poor, while when over 85 parts by weight, the effect of improvement of the temperature dependency becomes poor.

The starting rubber (C') must be viscoelastically compatible with the starting rubber (A'), be incompatible with the starting rubber (B'), have a Tg the same or less than the Tg of the starting rubber (A'), and be present in an amount of 5 to 30 parts by weight, preferably 5 to 10 parts by weight. When not compatible with the starting rubber (A') and incompatible with the starting rubber (B'), the dispersion of the rubber of the starting rubber (A') falls, while when the Tg is higher than the starting rubber (A') or the amount of formulation is less than 5 parts by weight, the dispersion of the rubber stock (A) falls. When over 30 parts by weight, the effect of improvement of the temperature gradient of the tanδ is reduced.

Another problem in the case of premixing a low Tg starting rubber and carbon black and then mixing the high Tg starting rubber stock is that sometimes the carbon black partially moves to the high Tg component, that is, the starting rubber (A'), added later during the mixing, so there is insufficient unevenness of distribution. The effect of improvement of the temperature gradient of the tanδ at this time is reduced. The reason is sometimes that there is insufficient bonding between the carbon black and the molecules of the rubber stock in the initial mixing process and sometimes that the later added starting rubber has a higher affinity with the carbon black.

As confirmed by the amount of the bound rubber produced, the bonds between the carbon black and the starting rubber molecules become stronger due to the heat of the mixing, so it is preferable to mix them at a high temperature. To bring out the effect of the present invention, the mixing is performed at 130° C. to 200° C., preferably 150° C. to 190° C. If the mixing temperature is less than 130° C., the bonding is insufficient, while when over 200° C., there is deterioration due to the heat, so the strength of the vulcanized rubber drops remarkably. By mixing by a hermetic type mixer, the temperature rises along with the mixing time and therefore the mixing temperature is not constant, but when a predetermined temperature is reached, the bonding between the starting rubber stock and the carbon black is completed in a short time of about 10 seconds. That is, as the initial mixing process, it is sufficient to hold the starting rubber (B') and the starting rubber (C') and reinforcing agent in the hermetic type mixer at the necessary temperature range for as little as 10 seconds. Then the starting rubber (A') and remaining reinforcing agent may be mixed by additionally charging them in the mixer after the initial mixing process or alternatively may be mixed in a hermetic mixer or open roll using a master batch obtained by discharging and cooling the initial mixture from the mixer.

The affinity of the starting rubber with the reinforcing agent differs depending on the type of the starting rubber. For example, NR, IR, and BR have a higher affinity with a reinforcing agent than SBR due to the large number of double bonds in the molecules. The most effective is the introduction of a functional group called "terminal modification". "Terminal modification", as for example described in Japanese Unexamined Patent Publication (Kokai) No. 64-60604, is an operation for causing a reaction of the alkali metal or alkali earth metal of the synthesis terminals of the starting rubber molecules with a compound having a —CO—N< or —CS—N< bond such as N-methyl-2-pyrrolidone. The effect is greater the higher the rate of modification of the synthesis terminals. Use is usually made of a starting rubber with a rate of modification of at least 20%. The terminal modified starting rubber is believed to bond on a priority basis at the surface of the carbon black.

Accordingly, when the affinity of the starting rubber (B') with the reinforcing agent is high, there is little fear of the reinforcing agent moving to the starting rubber (A') additionally added, but in the converse case, unless the temperature of the initial mixing process is raised to ensure sufficient achievement of a bound rubber, the effect of the present invention sometimes will not be sufficiently exhibited. In this way, the present invention becomes more effective by the use of a terminal modified rubber as the starting rubber (B').

The reinforcing agent is generally carbon black, but even when white carbon, a similar selection of starting rubbers and method of mixing as with carbon black may be used. In the case of white carbon (silica), however, generally joint use is made of a silane coupling agent. Such a formulation, however, requires that the white carbon be mixed together at the initial mixing process for improvement of the dispersion and wear resistance. The amount of the reinforcing agent is preferably 30 to 60 parts by weight. When the amount is less than 30 parts by weight, the temperature dependency of the tanδ becomes poorer, while conversely when over 60 parts by weight, the tanδ at 400° C. becomes greater even with the process of the present invention and the roll resistance becomes poor. Further, when mixing the starting rubbers (B') and (C'), it is necessary to mix at least 80% of the total amount of the reinforcing agent. The larger the amount of the remaining reinforcing agent mixed in with the starting rubber (A'), the less the effect of improvement of the temperature gradient of the tanδ.

The rubber composition of the present invention may have further blended into it in addition to the starting rubbers (A'), (B'), and (C') and the reinforcing agent, various types of additives which are generally mixed into rubber compositions for tires such as sulfur, a vulcanization accelerator, antioxidant, filler, softening agent, or plasticizer. The amounts and methods of mixture of these additives are not particularly limited and may be made the general amounts and methods.

According to the third aspect of the present invention, the present inventors found that by mixing three groups of starting rubbers (A"), (B"), and (C") having specific Tgs and compatibilities and a reinforcing agent in a specific order, it is possible to reduce the temperature dependence of the tanδ while maintaining the breaking strength. Further, there is the advantage that with this process, the rise in viscosity of the master batch during the mixing is small. Details will be explained below.

It is known that when mixing in advance part of the starting rubber and carbon black and then adding the remaining starting rubber, the carbon black tends to be unevenly distributed in the starting rubber and the tanδ changes. The previously cited Rubber Chem. Technol., vol. 61, p. 276 (1993) describes the effects of the method of mixing on the impact resiliences of a large number of blends. This reference does not describe anything regarding the correlation with the Tg of the rubber blends, but the present inventors noted this on their own and discovered that, when the impact resiliences described are converted to tanδ, the tanδ becomes larger when the carbon black was made to be unevenly distributed in the high Tg starting rubber rather than distributing it homogeneously in the high Tg and low Tg starting rubbers. However, there are differences in the magnitude of the effect depending on if part of the carbon black moves between blend phases in the process of mixing and the combination of the rubber stocks. No all-encompassing interpretation could be made of the state of the temperature gradient at 0° C. and 40° C.

Therefore, the inventors measured and studied the two Tgs and the viscoelastic compatibilities in systems comprising a large number of combinations of starting rubber with the carbon black made to be unevenly distributed in the high Tg rubber component and, as a result, found that the temperature gradient of tanδ at a certain degree of unevenness of distribution of the carbon black becomes smaller the closer the Tg of the high Tg component to −20° C. when two types of starting rubbers are viscoelastically incompatible and the two Tgs are separate from each other. Accordingly, the effect is greater when the Tgs of the two types of incompatible starting rubbers are as far apart from each other as possible. The difference must be at least 20° C., preferably at least 35° C.

"Viscoelastically incompatible" as spoken of here means that, when measuring the temperature dependency of the viscoelasticity of the vulcanized rubber, the tanδ peaks exhibited by the two starting rubbers are observed to be separate. This is believed to occur when the starting rubbers in the rubber composition are not completely mixed together and are separate in layers or islands of a size of at least several tends of nanometers and are separate in Tg. More specifically, as shown in FIG. 1, it is learned that starting rubbers are viscoelastically incompatible when there are two points which are sharing a tangent on the temperature dependence curve of the tanδ when the measured values of the tanδ are expressed on a logarithmic scale with respect to the temperature axis.

The present inventors measured the viscoelasticities at 0° C. and 40° C. and measured the unevenness of distribution of the carbon black obtained by the method of assaying the starting rubber composition in the bound rubber (carbon gel) of the unvulcanized rubber described in Rubber Chem. Technol., vol. 61, p. 609 (1988) and studied the relationship between the two in detail. As a result, they learned that, when looking at the effect of improvement of the temperature gradient of the tanδ expressed by (change in temperature gradient of tanδ)÷(change in unevenness of distribution of carbon black), with a Tg of the starting rubber of the high Tg component of less than −40° C., even if the carbon black is made to be distributed unevenly, there is almost no improvement in the temperature gradient of the tanδ, while when over −40° C., it gradually becomes smaller, when over −30° C. it sharply becomes smaller, and when near −10° C., becomes the best, but when over that once again becomes smaller. The reason why the effect of improvement of the temperature gradient of the tanδ becomes the best when the Tg of the starting rubber of the high Tg component is near −20° C. is not clear, but it is believed that, since in general the maximum point of the tanδ curve is at the side 10° to 20° C. higher than the Tg of the rubber stock, when the maximum point of the tanδ is near the measurement point, that is, 0° C., the effect of improvement becomes greatest.

When trying to improve the temperature dependency of the tanδ by causing uneven distribution of the carbon black, however, there are various problems in terms of industrial usage, as explained below, when just mechanically selecting two types of starting rubbers with different Tgs, mixing the low Tg starting rubber and the carbon black in the initial mixing process in advance, then adding the high Tg starting rubber in a later process, so this is not enough to obtain a rubber composition suited for a tire tread.

One problem is that, even, when adding and mixing additional starting rubber to a master batch obtained by mixing a starting rubber and reinforcing agent in advance, the latter starting rubber will not disperse well. Since starting rubbers inherently are hard to mix with each other, they are viscoelastically incompatible, but since one of the starting rubbers is bonded with the filler and forms a partially three-dimensional structure, mixing becomes even harder. Therefore, even if steps such as increasing the mixing time are taken, the breaking strength and wear resistance of the vulcanized rubber drop. Accordingly, the present inventors found the possibility of avoiding this problem by mixing in advance into the starting rubber of the master batch a small amount of a starting rubber easy to mix with the starting rubber to be additionally added and not impairing the shape of the peak of the tanδ.

However, it is probably a matter of experience what kind of starting rubber to select to enable both improvement of the temperature dependency of the tanδ and dispersion of the starting rubber (A"). It is possible to research the compatibility of two kinds of polymers using theoretical formulas to some extent, as for example described in Macromolecule, vol. 24, p. 4839 (1991), but this is insufficient. Further, it is extremely difficult to predict whether the viscoelastic incompatibilities can be held using three groups of starting rubbers (A"), (B"), and (C") as in the present invention.

The present inventors mixed large numbers of starting rubbers with different Tgs and measured their viscoelasticities so as to study if those combinations were viscoelastically compatible and, as a result, found that, when the starting rubber charged in the initial mixing process is the starting rubbers (A") and (C") and the starting rubber charged in the additional mixing process is the starting rubber (B"), selection from among the following five combinations is preferable for achieving the object of the present invention:

1) Starting rubber (A"): polybutadiene (BR) having a content of 1,2-bond butadiene in the butadiene portion of at least 65% by weight, preferably 65 to 85% by weight
Starting rubber (B"): BR having a cis-1,4 bond butadiene content of at least 95% by weight, preferably 97 to 99% by weight
Starting rubber (C"): BR having a cis-1,4-bond butadiene content of at least 95%, preferably 97 to 99% by weight, BR having a 1,2-bond butadiene content in the butadiene component of 10 to 50% by weight, preferably 12 to 20% by weight, and/or emulsion polymerized styrene-butadiene copolymer (emulsion polymerized SBR) having a styrene content of not more than 35% by weight, preferably 20 to 30% by weight.

2) Starting rubber (A"): BR having a 1,2-bond butadiene content of at least 65% by weight, preferably 65 to 85% by weight, and/or emulsion polymerized SBR having a styrene content of 30 to 50% by weight, preferably 35 to 45% by weight
Starting rubber (B"): BR having a 1,2-bond butadiene content of 10 to 50% by weight, preferably 12 to 20% by weight
Starting rubber (C"): BR having a 1,2-bond butadiene content of at least 65% by weight, preferably 65 to 85% by weight, and/or BR having a cis-1,4 bond butadiene content of at least 95% by weight, preferably 97 to 99% by weight 3) Starting rubber (A"): emulsion polymerized SBR having a styrene content of 30 to 50% by weight, preferably 35 to 45% by weight
Starting rubber (B"): natural rubber (NR) and/or polyisoprene rubber (IR)
Starting rubber (C"): NR, IR, and/or BR having a 1,2-bond butadiene content of at least 65% by weight, preferably 65 to 85% by weight 4) Starting rubber (A"): solution polymerized SBR having a 1,2-bond butadiene content of at least 70% by weight, preferably 70 to 85% by weight, and a styrene content of not more than 30% by weight, preferably 10 to 20% by weight
Starting rubber (B"): solution polymerized SBR having a 1,2-bond butadiene content of not more than 40% by weight, preferably 5 to 20% by weight, and a styrene content shown by the following formula (1"), emulsion polymerized SBR having a styrene content of not more than 35% by weight, preferably 20 to 35% by weight, BR having a cis-1,4 bond butadiene content of at least 95% by weight, preferably 97 to 99% by weight, and/or BR having a 1,2-bond butadiene content of 10 to 50% by weight, preferably 12 to 20% by weight
Starting rubber (C"): solution polymerized SBR having a 1,2-bond butadiene content of not more than 40% by weight, preferably 5 to 20% by weight, and a styrene content of the value shown by the following formula (1"), emulsion polymerized SBR having a styrene content of not more than 50% by weight, preferably 20 to 35% by weight, BR having a cis-1,4 bond butadiene content of at least 95% by weight, preferably 97 to 99% by weight, and/or BR having a 1,2-bond butadiene content of 10 to 50% by weight, preferably 12 to 20% by weight:

$$\text{Styrene content} < 40-(1,2\text{-bond butadiene content})\div 3 \qquad (1")$$

5) Starting rubber (A"): solution polymerized SBR having a 1,2-bond butadiene content of at least 70% by weight, preferably 10 to 70% by weight, and a styrene content of the value shown by the following formula (1")
Starting rubber (B"): solution polymerized SBR having a 1,2-bond butadiene content of not more than 40% by weight, preferably 5 to 20% by weight, and a styrene content shown by the following formula (1"), BR having a cis-1,4 bond butadiene content of at least 95% by weight, preferably 97 to 99% by weight, BR having a 1,2-bond butadiene content of 10 to 50% by weight, preferably 12 to 20% by weight, NR, and/or IR
Starting rubber (C"): solution polymerized SBR having a 1,2-bond butadiene content of not more than 40% by weight, preferably 5 to 20% by weight, and a styrene content of the value shown by the following formula (1"), BR having a cis-1,4 bond butadiene content of at least 95% by weight, preferably 97 to 99% by weight, BR having a 1,2-bond butadiene content of 10 to 50% by weight, preferably 12 to 20% by weight, NR, and/or IR:

$$\text{Styrene content} < 40-(1,2\text{-bond butadiene content})\div 3 \qquad (1")$$

$$\text{Styrene content} > 40-(1,2\text{-bond butadiene content})\div 3 \qquad (2")$$

In all of these five preferable combinations, the following is essential: That is, the starting rubber (A") must have a Tg of −40° C. to 10° C. and be present in an amount of 30 to 85 parts by weight, preferably 50 to 75 parts by weight. When the Tg is less than −40° C., there is little effect of improvement of the temperature gradient of the tanδ, while when over 10° C., the rubber hardness becomes higher and the rubber is not practical for a tire tread. When the amount of formulation is over 85 parts by weight, there is a poor effect of improvement of the temperature gradient of the tanδ, while when less than 30 parts by weight, the viscosity of the master batch becomes higher and the workability is poor.

The starting rubber (B") must be viscoelastically incompatible with the starting rubber (A"), have a Tg at least 20° C., preferably 35° to 60° C., lower than the Tg of the starting rubber (A"), and be present in an amount of 10 to 40 parts by weight, preferably 15 to 30 parts by weight. When compatible with the starting rubber (A"), there is no uneven distribution of the reinforcing agent, while when the temperature difference of the Tg is smaller than 20° C., no effect of improvement of the temperature dependency of the tanδ can be expected. When over 40 parts by weight, the workability becomes poor, while when less than 10 parts by weight, the effect of improvement of the temperature dependency becomes poor.

The starting rubber (C") must be viscoelastically incompatible with the starting rubber (A"), be compatible with the starting rubber (B"), have a Tg the same or less than the Tg of the starting rubber (A"), and be present in an amount of 5 to 30 parts by weight, preferably 5 to 10 parts by weight. When not compatible with the starting rubber (A") and incompatible with the starting rubber (B"), the dispersion of the rubber of the starting rubber (A") falls, while when the Tg is higher than the starting rubber (A") or the amount of formulation is less than 5 parts by weight, the dispersion of the starting rubber (A") falls. When over 30 parts by weight, the effect of improvement of the temperature gradient of the tanδ is reduced.

Another problem in the case of premixing a low Tg starting rubber (B') and carbon black and then mixing the high Tg starting rubber is that sometimes the carbon black partially moves to the high Tg component, that is, the starting rubber (A"), added later during the mixing, so there is insufficient unevenness of distribution. The effect of improvement of the temperature gradient of the tanδ at this time is reduced. The reason is sometimes that there is insufficient bonding between the carbon black and the molecules of the starting rubber in the initial mixing process and sometimes that the later added starting rubber has a higher affinity with the carbon black.

As confirmed by the amount of the bound rubber produced, the bonds between the carbon black and the starting rubber molecules become stronger due to the heat of the mixing, so it is preferable to mix them at a high temperature. To bring out the effect of the present invention, the mixing is performed at 130° C. to 200° C., preferably 150° C. to 190° C., for at least 10 seconds, preferably 10 to 60 seconds. When the mixing temperature is less than 130° C., the bonding is insufficient, while when over 200° C., there is deterioration due to the heat, so the strength of the vulcanized rubber drops remarkably. By mixing by a hermetic type mixer, the temperature rises along with the mixing time and therefore the mixing temperature is not constant, but when a predetermined temperature is reached, the bonding between the starting rubber and the carbon black is completed in a short time of about 10 seconds. That is, as the initial mixing process, it is sufficient to hold the starting rubber (A") and the starting rubber (C") and reinforcing agent in the hermetic type mixer at the necessary temperature range for as little as 10 seconds.

Then the starting rubber (B") and remaining reinforcing agent may be mixed by additionally charging them in the mixer after the initial mixing process or alternatively may be mixed in a hermetic type mixer or open roll using a master batch obtained by discharging and cooling the initial mixture from the mixer.

The affinity of the starting rubber with the reinforcing agent differs depending on the type of the starting rubber. For example, NR, IR, and BR have a higher affinity with a reinforcing agent than SBR due to the large number of double bonds in the molecules. The most effective is the introduction of a functional group called "terminal modification". "Terminal modification", as, for example, described in Japanese Unexamined Patent Publication (Kokai) No. 64-60604, is an operation for causing a reaction of the alkali metal or alkali earth metal of the synthesis terminals of the starting rubber molecules with a compound having a —CO—N< or —CS—N< bond such as N-methyl-2-pyrrolidone. The effect is greater the higher the rate of modification of the synthesis terminals. Use is usually made of a starting rubber with a rate of modification of at least 20%. The terminal modified starting rubber is believed to bond on a priority basis at the surface of the carbon black. Accordingly, when the affinity of the starting rubber (A") with the reinforcing agent is high, there is little fear of the reinforcing agent moving to the starting rubber (B") additionally added, but in the converse case, unless the temperature of the initial mixing process is raised to ensure sufficient achievement of a bound rubber, the effect of the present invention sometimes will not be sufficiently exhibited. In this way, the present invention becomes more effective by the use of a terminal modified rubber as the starting rubber (A").

The reinforcing agent is generally carbon black, but even when white carbon, a similar selection of rubber stocks and method of mixing as with carbon black may be used. In the case of white carbon (i.e., silica), however, generally joint use is made of a silane coupling agent. Such a formulation, however, requires that the white carbon be mixed together at the initial mixing process for improvement of the dispersion and wear resistance. The amount of the reinforcing agent is preferably 60 to 100 parts by weight. When the amount is less than 60 parts by weight, the temperature dependency of the tanδ becomes poorer, while conversely when over 100 parts by weight, the workability and the breaking strength fall. Further, when mixing the starting rubbers (A") and (C"), it is necessary to mix at least 80% of the total amount of the reinforcing agent. The larger the amount of the remaining reinforcing agent mixed with the starting rubber (B"), the less the effect of improvement of the temperature gradient of the tanδ.

The rubber composition of the present invention may have further blended into it, in addition to the starting rubbers (A"), (B"), and (C") and the reinforcing agent, various types of additives which are generally mixed into rubber compositions for tires such as sulfur, a vulcanization accelerator, antioxidant, filler, softening agent, or plasticizer. The amounts and methods of mixture of these additives are not particularly limited and may be made the general amounts and methods.

The present invention will be further explained in detail by, but is not limited to, the following Examples.

EXAMPLES I-1 to I-12

1) Starting materials

The following commercially available products were used as the starting materials in the following Examples.

(1) Solution polymerized BR: Nippon Zeon Nipole BR1220, Tg=−102° C., cis-1,4 bond content=98%

(2) Solution polymerized BR: Asahi Chemical Industries Diene NF 35R, Tg =−90° C., 1,2-bond content=13%

(3) Natural rubber: TSR20, Tg=−73° C.

(4) Solution polymerized SBR: Asahi Chemical Industries Tufden 1000R, Tg=−72° C., styrene content=18%, 1,2-bond content=9%

(5) Solution polymerized SBR: Nippon Elastomer Sorprene 303, Tg=−33° C., styrene content=47%, 1,2-bond content=29%

(6) Emulsion polymerized SBR: Nippon Zeon Nipole 9520, Tg=−32° C., styrene content=38%, 1,2-bond content =14%, oil extended product with 37.5 parts by weight of aromatic process oil added based upon 100 parts by weight of the starting rubber (7) Terminal modified solution polymerized SBR: Nippon Zeon Nipole NS116, Tg=−30° C., styrene content=21%, 1,2-bond content=67%

(8) Solution polymerized BR: Nippon Zeon Nipole BR1240, Tg=−30° C., 1,2-bond content=70%

(9) Terminal modified solution polymerized SBR: Nippon Zeon Nipole NS110, Tg=−25° C., styrene content=14%, 1,2-bond content=77%

(10) Carbon black, HAF

(11) Zinc white no. 3

(12) Industrial stearic acid

(13) N-phenyl-N'-(1,3-dimethylbutyl)-p-phenylenediamine

(14) Microcrystalline wax

(15) Aromatic process oil

(16) 5% oil treated powdered sulfur

(17) Diphenylguanidine

(18) N-cyclohexyl-2-benzothiazylsulfenamide

Note that the parts of the materials in Tables I-1 to I-2 are expressed as parts by weight.

2) Preparation of Rubber Composition

The initial mixing process (first process) comprises mixing the starting rubber (A) and the optional component starting rubber (C), carbon black, zinc white, stearic acid, an antioxidant, wax, and process oil in a 1.8 liter hermetic type mixer for 3 to 5 minutes. The materials are charged into the hermetic type mixer at room temperature. When a predetermined temperature is reached due to the heat of the mixing, the result is discharged and kneaded by an 8 inch open roll to form a sheet-like master batch. The discharge temperature was controlled to 165° C.

The additional mixing process (second process) comprises charging the master batch and the starting rubber (B) into a 1.8 liter hermetic type mixer, mixing them for 2 minutes, then discharging the result, adding sulfur and a vulcanization accelerator, and kneading using an 8 inch open roll to obtain a rubber composition. The discharge temperature was 115° to 125° C.

3) Measurement of Physical Properties of Vulcanized Rubber

The rubber composition obtained was vulcanized in a 15×15×0.2 cm mold at 160° C. for 20 minutes to prepare a rubber sheet. The breaking strength was measured based on JIS K6251 using a dumbbell shaped No. 3 piece. The value was expressed by MPa. The tanδ at 0° C. and 40° C. were measured using booklet shaped samples at 20 Hz and an elongation deformation mode of 10±2%.

Example I-1 (Standard Example) and Example I-2 (Example of Invention) of Table I-1 show the results of use of (3) NR and (7) SBR for the starting rubbers. (3) NR and (7) SBR are incompatible. In Example I-2 (Example of Invention), the starting rubber (A) corresponds to the (7) SBR, and the starting rubber (B) corresponds to the (3) NR. In both Example I-1 and Example I-2, the amounts of mixture in the first process and second process are identical. In Example I-2, the high Tg starting rubber is mixed in the first process and the low Tg starting rubber is added in the second process. The final compositions of the rubber compositions obtained in Example I-1 and Example I-2 are identical, yet the temperature gradient of the tanδ of Example I-1 is 2.72 and the temperature gradient of Example I-2 where the low Tg (3) NR was additionally charged in the second process is 2.62. It is learned that the rubber compositions of the present invention are improved in temperature gradient and have the features preferable for tire treads.

Example I-3 (Standard Example) and Example I-4 (Example of Invention) are examples of use of (1) BR and (5) SBR for the starting rubbers. (1) BR and (5) SBR are incompatible. In Example I-4, the starting rubber (A) corresponds to the (5) SBR, the starting rubber (B) corresponds to the (1) BR, and starting rubber (C) corresponds to the (1) BR. The temperature gradient of the tanδ in Example I-3 where 25 parts by weight of the high Tg (5) SBR was charged in the second process was 2.72, while the temperature gradient of Example I-5 where the low Tg (1) BR was additionally charged in the same 25 parts by weight was improved to 2.62.

Example I-5 (Standard Example) and Example I-6 (Example of Invention) are examples of use of (4) SBR and (9) SBR for the starting rubbers. (4) SBR and (9) SBR are incompatible. In Example I-6, the starting rubber (A) corresponds to the (9) SBR, and the starting rubber (B) corresponds to the (4) SBR. Compared with Example I-5 wherein all of the rubber is charged in the first process, the temperature dependency of the tanδ of Example I-6 where the (4) SBR was charged in the second process was smaller and improved.

TABLE I-1

| Ex. No. | I-1*[1] | I-2*[2] | I-3*[1] | I-4*[2] | I-5*[1] | I-6*[2] |
| --- | --- | --- | --- | --- | --- | --- |
| 1st process | | | | | | |
| (1) BR | — | — | 30 | 5 | — | — |
| (3) NR | 21 | — | — | — | — | — |
| (4) SBR | — | — | — | — | 35 | — |
| (5) SBR | — | — | 45 | 70 | — | — |
| (7) SBR | 49 | 70 | — | — | — | — |
| (9) SBR | — | — | — | — | 65 | 65 |
| (10) carbon black | 70 | 70 | 70 | 70 | 70 | 70 |
| (11) zinc oxide | 3 | 3 | 3 | 3 | 3 | 3 |
| (12) antioxidant | 2 | 2 | 2 | 2 | 2 | 2 |
| (13) stearic acid | 2 | 2 | 2 | 2 | 2 | 2 |
| (14) wax | 1 | 1 | 1 | 1 | 1 | 1 |
| (15) oil | 35 | 35 | 35 | 35 | 35 | 35 |
| 2nd process | | | | | | |
| (1) BR | — | — | — | 25 | — | — |
| (3) NR | 9 | 30 | — | — | — | — |
| (4) SBR | — | — | — | — | — | 35 |
| (5) SBR | — | — | 25 | — | — | — |
| (7) SBR | 21 | — | — | — | — | — |
| (16) sulfur | 2.1 | 2.1 | 2.1 | 2.1 | 2.1 | 2.1 |
| (17) vulcanization accelerator | 0.5 | 0.5 | 0.5 | 0.5 | 0.5 | 0.5 |
| (18) vulcanization accelerator | 0.5 | 0.5 | 0.5 | 0.5 | 0.5 | 0.5 |

TABLE I-1-continued

| Ex. No. | I-1*1 | I-2*2 | I-3*1 | I-4*2 | I-5*1 | I-6*2 |
|---|---|---|---|---|---|---|
| Physical properties of vulcanized rubber | | | | | | |
| tanδ 0° C. (A) | 0.740 | 0.767 | 0.740 | 0.767 | 0.615 | 0.602 |
| tanδ 40° C. (B) | 0.272 | 0.293 | 0.272 | 0.293 | 0.282 | 0.288 |
| Temperature gradient (A/B) | 2.72 | 2.62 | 2.72 | 2.62 | 2.18 | 2.09 |

*1: Standard Example
*2: Example of Invention

Table I-2 confirms the present invention by other starting rubbers. Example I-7 (Standard Example) and Example I-8 (Example of Invention) are identical in final compositions of the rubber compositions. Similarly, Example I-9 (Standard Example) and Example I-10 (Example of Invention) are identical in compositions. In Example I-8, the A group corresponds to (8) BR and the B group to (1) BR, in Example I-10, the A group corresponds to (6) SBR and the B group to (2) BR, and in Example I-12, the A group corresponds to (6) SBR and the B group to (3) NR. Example I-8, Example I-10, and Example I-12 of the present invention are improved in the temperature gradients of the tanδ compared with the Standard Examples, it is learned.

(1) Solution polymerized BR: Nippon Zeon Nipole BR1220, Tg=−102° C., cis-1,4 bond content=98%

(2) Solution polymerized BR: Asahi Chemical Industries Diene NF 35R, Tg=−90° C., 1,2-bond content=13%

(3) Natural rubber: TSR20, Tg=−73° C.

(4) Solution polymerized SBR: Asahi Chemical Industries Tufden 1000R, Tg=−72° C., styrene content=18%, 1,2-bond content=9%

(5) Terminal modified solution polymerized SBR: Nippon Zeon Nipole NS114, Tg=−47° C., styrene content=23%, 1,2-bond content=37%

TABLE I-2

| Ex. No. | I-7*1 | I-8*2 | I-9*1 | I-10*2 | I-11*1 | I-12*2 |
|---|---|---|---|---|---|---|
| 1st process | | | | | | |
| (1) BR | 24 | — | — | — | — | — |
| (2) BR | — | — | 26.9 | — | — | — |
| (3) NR | — | — | — | — | 26.9 | — |
| (6) SBR | — | — | 55.6 | 82.5 | 55.6 | 82.5 |
| (8) BR | 36 | 60 | — | — | — | — |
| (10) carbon black | 70 | 70 | 70 | 70 | 70 | 70 |
| (11) zinc oxide | 3 | 3 | 3 | 3 | 3 | 3 |
| (12) antioxidant | 2 | 2 | 2 | 2 | 2 | 2 |
| (13) stearic acid | 2 | 2 | 2 | 2 | 2 | 2 |
| (14) wax | 1 | 1 | 1 | 1 | 1 | 1 |
| (15) oil | 35 | 35 | 12.5 | 12.5 | 12.5 | 12.5 |
| 2nd process | | | | | | |
| (1) BR | 16 | 40 | — | — | — | — |
| (2) BR | — | — | 13.1 | 40 | — | — |
| (3) NR | — | — | — | — | 13.1 | 40 |
| (6) SBR | — | — | 26.9 | — | 26.9 | — |
| (8) BR | 24 | — | — | — | — | — |
| (16) sulfur | 2.1 | 2.1 | 2.1 | 2.1 | 2.1 | 2.1 |
| (17) vulcanization accelerator | 0.5 | 0.5 | 0.5 | 0.5 | 0.5 | 0.5 |
| (18) vulcanization accelerator | 0.5 | 0.5 | 0.5 | 0.5 | 0.5 | 0.5 |
| Physical properties of vulcanized rubber | | | | | | |
| tanδ 0° C. (A) | 0.352 | 0.319 | 0.460 | 0.452 | 0.610 | 0.607 |
| tanδ 40° C. (B) | 0.267 | 0.270 | 0.317 | 0.337 | 0.321 | 0.339 |
| Temperature gradient (A/B) | 1.32 | 1.18 | 1.45 | 1.34 | 1.90 | 1.79 |

*1: Standard Example
*2: Example of Invention

As clear from Tables I-1 and I-2, the rubber compositions of the process of production of the present invention feature a large tanδ and a low temperature dependency at 0° C. and 40° C. By using them for a tire tread, the feature is obtained of a stable high level of grip on the road surface even in the face of changes in the ambient temperature.

EXAMPLES II-1 to II-16

1) Starting materials

The following commercially available products were used in the following Examples.

(6) Solution polymerized SBR: Nippon Elastomer Sorprene 303, Tg=−33° C., styrene content=47%, 1,2-bond content=29%

(7) Emulsion polymerized SBR: Nippon Zeon Nipole 9520, Tg=−32° C., styrene content=38%, 1,2-bond content =14%, oil extended product with 37.5 parts by weight of aromatic process oil added based upon 100 parts by weight of rubber stock (8) Terminal modified solution polymerized SBR:
Nippon Zeon Nipole NS116, Tg=−30° C., styrene content=21%, 1,2-bond content=67%

(9) Solution polymerized BR: Nippon Zeon Nipole BR1240, Tg=−30° C., 1,2-bond content=70%

(10) Carbon black, HAF

(11) Zinc white no. 3

(12) Industrial stearic acid

(13) N-phenyl-N'-(1,3-dimethylbutyl)-p-phenylenediamine

(14) Microcrystalline wax

(15) Aromatic process oil

(16) 5% oil treated powdered sulfur

(17) Diphenylguanidine

(18) N-cyclohexyl-2-benzothiazylsulfenamide

Note that the parts of the materials in Tables II-1 to II-5 are expressed as parts by weight.

2) Preparation of Rubber Composition

The initial mixing process (first process) comprises mixing the starting rubber (B'), the starting rubber (C'), carbon black, zinc white, stearic acid, an antioxidant, wax, and process oil in a 1.8 liter hermetic type mixer for 3 to 5 minutes. The materials are charged into the hermetic type mixer at room temperature. When a predetermined temperature is reached due to the heat of the mixing, the result is discharged and kneaded by an 8 inch open roll to form a sheet-like master batch. The discharge temperature was controlled to 110° C. only in Comparative Example II-5 and to 165° C. in the other Examples.

The additional mixing process (second process) comprises charging the master batch and the starting rubber (A') into a 1.8 liter hermetic type mixer, mixing them for 2 minutes, then discharging the result, adding sulfur and a vulcanization accelerator, and kneading using an 8 inch open roll to obtain a rubber composition. The discharge temperature was 115° C. to 125° C. Note that when not using the starting rubber (A'), just the master batch is mixed again in the hermetic type mixer and kneaded by an open roll with the sulfur and vulcanization accelerator to make the rubber composition.

3) Measurement of Physical Properties of Vulcanized Rubber

The rubber composition obtained was vulcanized in a 15×15×0.2 cm mold at 160° C. for 20 minutes to prepare a rubber sheet. The breaking strength was measured based on JIS K6251 using a dumbbell shaped no. 3 piece. The value was expressed by MPa. The tanδ at 0° C. and 40° C. were measured using booklet shaped samples at 20 Hz and an elongation deformation mode of 10±2%.

Table II-1 shows the results of use of (3) NR, (5) terminal modified solution polymerized SBR, and (8) terminal modified solution polymerized SBR for the starting rubbers. The (5) terminal modified solution polymerized SBR and (8) terminal modified solution polymerized SBR are compatible, while the (3) NR is incompatible with these two SBR. In Example II-4 (Example of Invention) and Example II-5 (Comparative Example), the starting rubber (A') corresponds to the (8) terminal modified solution polymerized SBR, the starting rubber (B) corresponds to the (3) NR, and the starting rubber (C) corresponds to the (5) terminal modified solution polymerized SBR.

The temperature gradient of the tanδ of Example II-1 (Standard Example) where all of the starting rubbers (A'), (B'), and (C') were charged in the first process was 2.57, while in Example II-2 (Standard Example) where the NR was charged in the second process, the temperature gradient was somewhat improved to 2.66 due to the dispersion of the carbon black. Further, Example II-3 (Comparative Example) where the NR and carbon black were mixed in the first process, then two types of SBR were added in the second process was greatly improved in the temperature gradient to 3.00, but had the defect of a reduced breaking strength. On the other hand, Example II-4 (Example of Invention) of the present invention where 10 parts by weight of (4) solution polymerized SBR was mixed together with the (3) NR in the first process showed a recovery of the breaking strength while maintaining a large temperature gradient of the tanδ and exhibited rubber properties desirable for a tire tread. Further, when the temperature of the first process was dropped from 165° C. to 110° C. with the same formulation as in Example II-4 (Example of Invention), the temperature gradient became lower as seen in Example II-5 (Comparative Example).

TABLE II-1

| Ex. No. | II-1*[1] | II-2*[2] | II-3*[2] | II-4*[3] | II-5*[2] |
|---|---|---|---|---|---|
| 1st process | | | | | |
| (3) NR | 65 | 40 | 65 | 65 | 65 |
| (5) SBR | 10 | 10 | — | 10 | 10 |
| (8) SBR | 25 | 25 | — | — | — |
| (10) carbon black | 40 | 40 | 40 | 40 | 40 |
| (11) zinc oxide | 3 | 3 | 3 | 3 | 3 |
| (12) antioxidant | 2 | 2 | 2 | 2 | 2 |
| (13) stearic acid | 2 | 2 | 2 | 2 | 2 |
| (14) wax | 1 | 1 | 1 | 1 | 1 |
| (15) oil | 5 | 5 | 5 | 5 | 5 |
| Maximum temperature reached | 165° C. | 165° C. | 165° C. | 165° C. | 110° C. |
| 2nd process | | | | | |
| (3) NR | — | 25 | — | — | — |
| (5) SBR | — | — | 20 | — | — |
| (8) SBR | — | — | 25 | 25 | 25 |
| (16) sulfur | 2.1 | 2.1 | 2.1 | 2.1 | 2.1 |
| (17) vulcanization accelerator | 0.5 | 0.5 | 0.5 | 0.5 | 0.5 |
| (18) vulcanization accelerator | 0.5 | 0.5 | 0.5 | 0.5 | 0.5 |
| Physical properties of vulcanized rubber | | | | | |
| Breaking strength (MPa) | 25.3 | 25 | 22.5 | 24.2 | 23.7 |
| tanδ 0° C. (A) | 0.36 | 0.354 | 0.348 | 0.357 | 0.351 |
| tanδ 40° C. (B) | 0.14 | 0.133 | 0.116 | 0.122 | 0.13 |
| Temperature gradient (A/B) | 2.57 | 2.66 | 3 | 2.93 | 2.7 |

*[1]: Standard Example
*[2]: Comparative Example
*[3]: Example of Invention

Table II-2 shows Examples of use of the (4) solution polymerized SBR and (9) solution polymerized BR. The (4) solution polymerized SBR and (9) solution polymerized BR are incompatible. In Example II-7 (Example of Invention), the starting rubber (A') corresponds to the (9) solution polymerized BR, the starting rubber (B') corresponds to the (4) solution polymerized SBR, and the starting rubber (C') corresponds to the (9) solution polymerized BR. The temperature gradient of the tanδ of the Example II-6 (Standard Example) is 1.73, while the temperature gradient of Example II-7 (Example of Invention) where 10 parts by weight of the (9) solution polymerized BR was added in the first process and 30 parts by weight was added in the second process was an improved 1.91.

TABLE II-2

| Ex. No. | II-6*1 | II-7*3 |
|---|---|---|
| 1st process | | |
| (4) SBR | 30 | 50 |
| (9) BR | 30 | 10 |
| (10) carbon black | 50 | 50 |
| (11) zinc oxide | 3 | 3 |
| (12) stearic acid | 1 | 1 |
| (13) antioxidant | 1 | 1 |
| (14) wax | 1 | 1 |
| (15) oil | 5 | 5 |
| 2nd process | | |
| (4) SBR | 20 | — |
| (9) BR | 20 | 40 |
| (16) sulfur | 1.8 | 1.8 |
| (18) vulcanization accelerator | 1 | 1 |
| Physical properties of vulcanized rubber | | |
| Breaking strength (MPa); | 17.2 | 17.4 |
| tanδ 0° C. (A) | 0.319 | 0.321 |
| tanδ 40° C. (B) | 0.184 | 0.168 |
| Temperature gradient (A/B) | 1.73 | 1.91 |

*1Standard Example
*3Example of invention

Table II-3 shows Examples of use of the (3) NR and (8) terminal modified solution polymerized SBR for the starting rubbers. The (3) NR and (8) terminal modified solution polymerized SBR are incompatible. In Example II-10 (Example of Invention), the starting rubber (A') corresponds to the (8) terminal modified solution polymerized SBR, the starting rubber (B') corresponds to the (3) NR, and the starting rubber (C') corresponds to the (8) terminal modified solution polymerized SBR.

Since the percent compositions of the starting rubbers are made the same in the first process and the second process, the temperature gradient of the tanδ of Example II-8 (Comparative Example) where 21 parts by weight of (3) NR and 9 parts by weight of (8) terminal modified solution polymerized SBR are additionally charged in the second process was 3.35. On the other hand, the temperature gradient of Example II-9 (Comparative Example) where the same 30 parts by weight, but of a high Tg (8) terminal modified solution polymerized SBR was additionally charged in the second process was an improved 3.74, but the breaking strength fell. From this, it is easily learned that charging the starting rubbers divided into processes is not important and that the additional charging of the incompatible high Tg starting rubber in the second process improves the temperature gradient.

Example II-10 (Example of Invention) aims at reduction of the breaking strength while maintaining the effect of improvement of the temperature gradient. By adding 5 parts by weight of (8) terminal modified solution polymerized SBR in the first process, the dispersion of the starting rubber added in the second process is improved and the breaking strength is improved over Example II-9 (Comparative Example). Further, the temperature gradient was 3.62—higher than Example II-8 (Standard Example).

TABLE II-3

| Ex. No. | II-8*1 | II-9*2 | II-10*3 |
|---|---|---|---|
| 1st process | | | |
| (3) NR | 49 | 70 | 70 |
| (8) SBR | 21 | | 5 |
| (10) carbon black | 40 | 40 | 40 |
| (11) zinc oxide | 3 | 3 | 3 |
| (12) stearic acid | 2 | 2 | 2 |
| (13) antioxidant | 2 | 2 | 2 |
| (14) wax | 1 | 1 | 1 |
| (15) oil | 5 | 5 | 5 |
| 2nd process | | | |
| (3) NR | 21 | — | — |
| (8) SBR | 9 | 30 | 25 |
| (16) sulfur | 2.1 | 2.1 | 2.1 |
| (17) vulcanization accelerator | 0.5 | 0.5 | 0.5 |
| (18) vulcanization accelerator | 0.5 | 0.5 | 0.5 |
| Physical properties of vulcanized rubber | | | |
| Breaking strength (MPa) | 26.7 | 23.8 | 24.9 |
| tanδ 0° C. (A) | 0.379 | 2 | 0.377 |
| tanδ 40° C. (B) | 0.113 | 0.101 | 0.103 |
| Temperature gradient (A/B) | 3.35 | 3.74 | 3.62 |

*1Standard Example
*2Comparative Example
*3Example of Invention

Table II-4 shows examples of use of the (1) solution polymerized BR and (6) solution polymerized SBR for the starting rubbers. The (1) solution polymerized BR and (6) solution polymerized SBR are incompatible. In Example II-12 (Example of Invention), the starting rubber (A') corresponds to the (6) solution polymerized SBR, the starting rubber (B') corresponds to the (1) solution polymerized BR, and the starting rubber (C) corresponds to the (6) solution polymerized SBR.

It is learned that in Example II-12 (Example of Invention) of the present invention, the temperature dependency of the tanδ is larger compared with Example II-11 (Comparative Example) where 25 parts by weight of the low Tg (1) solution polymerized BR is additionally charged in the second process.

TABLE II-4

| Ex. No. | II-11*2 | II-12*3 |
|---|---|---|
| 1st process | | |
| (1) BR | 45 | 70 |
| (6) SBR | 30 | 5 |
| (10) carbon black | 40 | 40 |
| (11) zinc oxide | 3 | 3 |
| (12) stearic acid | 2 | 2 |
| (13) antioxidant | 2 | 2 |
| (14) wax | 1 | 1 |
| (15) oil | 5 | 5 |
| 2nd process | | |
| (1) BR | 25 | — |
| (6) SBR | — | 25 |
| (16) sulfur | 2.1 | 2.1 |
| (17) vulcanization accelerator | 0.5 | 0.5 |
| (18) vulcanization accelerator | 0.5 | 0.5 |

TABLE II-4-continued

| Ex. No. | II-11*[2] | II-12*[3] |
|---|---|---|
| Physical properties of vulcanized rubber | | |
| Breaking strength (MPa) | 19.2 | 19.1 |
| tanδ 0° C. (A) | 0.343 | 0.338 |
| tanδ 40° C. (B) | 0.138 | 0.134 |
| Temperature gradient (A/B) | 1.92 | 2.1 |

*[2]Comparative Example
*[3]Example of invention

Table II-5 confirms the present invention by other starting rubbers. Compared with Example II-13 (Standard Example) where the incompatible (2) solution polymerized BR and (7) emulsion polymerized SBR are combined, Example II-14 (Example of Invention) was improved in the temperature gradient. Further, compared with Example II-15 (Standard Example) where the incompatible (2) solution polymerized BR and (9) solution polymerized BR are combined, Example II-16 (Example of Invention) was improved in temperature gradient.

TABLE II-5

| Ex. No. | II-13*[1] | II-14*[3] | II-15*[1] | II-16*[3] |
|---|---|---|---|---|
| 1st process | | | | |
| (2) BR | 30 | 60 | 30 | 50 |
| (7) SBR | 43.75 | 13.75 | | |
| (9) BR | | | 30 | 10 |
| (10) carbon black | 50 | 50 | 50 | 50 |
| (11) zinc oxide | 3 | 3 | 3 | 3 |
| (12) stearic acid | 1 | 1 | 1 | 1 |
| (13) antioxidant | 1 | 1 | 1 | 1 |
| (14) wax | 1 | 1 | 1 | 1 |
| (15) oil | — | — | 5 | 5 |
| 2nd process | 30 | — | 20 | — |
| (2) BR | 11.25 | 41.25 | — | — |
| (7) SBR | — | — | 20 | 40 |
| (9) BR | 1.8 | 1.8 | 1.8 | 1.8 |
| (16) sulfur | 1 | 1 | 1 | 1 |
| (18) vulcanization accelerator | | | | |
| Physical properties of vulcanized rubber | | | | |
| Breaking strength (MPa) | 24.6 | 24.3 | 18.9 | 19.1 |
| tanδ 0° C. (A) | 0.356 | 0.36 | 0.254 | 0.262 |
| tanδ 40° C. (B) | 0.217 | 0.197 | 0.177 | 0.155 |
| Temperature gradient (A/B) | 1.64 | 1.83 | 1.44 | 1.69 |

*[1]: Standard Example
*[3]: Example of Invention

As clear from the results of Tables II-1 to II-5, the rubber compositions of the process of production of the present invention feature a large tanδ at 0° C. and a low tanδ at 40° C. while maintaining the breaking strength. By using them for a tire tread, durability during driving, a strong grip on a wet road surface, and a low roll resistance are obtained.

EXAMPLES III-1 to III-16

1) Starting materials

The following commercially available products were used in the following Examples.

(1) Solution polymerized BR: Nippon Zeon Nipole BR1220, Tg=–102° C., cis-1,4 bond content=98%

(2) Solution polymerized BR: Asahi Chemical Industries Diene NF 35R, Tg=–90° C., 1,2-bond content=13%

(3) Natural rubber: TSR20, Tg=–73° C.

(4) Solution polymerized SBR: Asahi Chemical Industries Tufden 1000R, Tg=–72° C., styrene content=18%, 1,2-bond content=9%

(5) Solution polymerized SBR: Nippon Elastomer Sorprene 303, Tg=–33° C., styrene content=47%, 1,2-bond content=29%

(6) Emulsion polymerized SBR: Nippon Zeon Nipole 9520, Tg=–32° C., styrene content=38%, 1,2-bond content –14%, oil extended product with 37.5 parts by weight of aromatic process oil added based upon 100 parts by weight of starting rubber (7) Terminal modified solution polymerized SBR: Nippon Zeon Nipole NS116, Tg=–30° C., styrene content=21%, 1,2-bond content=67%

(8) Solution polymerized BR: Nippon Zeon Nipole BR1240, Tg=–30° C., 1,2-bond content=70%

(9) Terminal modified solution polymerized SBR: Nippon Zeon Nipole NS110, Tg=–25° C., styrene content=14%, 1,2-bond content=77%

(10) Carbon black, HAF

(11) Zinc white no. 3

(12) Industrial stearic acid

(13) N-phenyl-N'-(1,3-dimethylbutyl)-p-phenylenediamine

(14) Microcrystalline wax

(15) Aromatic process oil

(16) 5% oil treated powdered sulfur

(17) Diphenylguanidine

(18) N-cyclohexyl-2-benzothiazylsulfenamide

Note that the parts of the materials in Tables III-1 to III-4 are expressed as parts by weight.

2) Preparation of Rubber Composition

The initial mixing process (first process) comprises mixing the starting rubber (A"), the starting rubber (C"), carbon black, zinc white, stearic acid, an antioxidant, wax, and process oil in a 1.8 liter hermetic type mixer for 3 to 5 minutes. The materials are charged into the hermetic type mixer at room temperature. When a predetermined temperature is reached due to the heat of the mixing, the result is discharged and kneaded by an 8 inch open roll to form a sheet-like master batch. The discharge temperature was controlled to 165° C.

The additional mixing process (second process) comprises charging the master batch and the starting rubber (B") into a 1.8 liter hermetic type mixer, mixing them for 2 minutes, then discharging the result, adding sulfur and a vulcanization accelerator, and kneading using an 8 inch open roll to obtain a rubber composition. The discharge temperature was 115° C. to 125° C.

3) Measurement of Physical Properties of Vulcanized Rubber

The rubber composition obtained was vulcanized in a 15×15×0.2 cm mold at 160° C. for 20 minutes to prepare a rubber sheet. The breaking strength was measured based on JIS K6251 using a dumbbell shaped no. 3 piece. The value was expressed by MPa. The tanδ at 0° C. and 40° C. were measured using booklet shaped samples at 20 Hz and an elongation deformation mode of 10±2%.

Table III-1 shows the results of use of (3) NR and (7) terminal modified solution polymerized SBR for the starting rubbers. (3) NR and (7) terminal modified solution polymerized SBR are incompatible. In Example III-3 (Example of Invention), the starting rubber (A") corresponds to the (7) terminal modified solution polymerized SBR, the starting rubber (B") corresponds to the (3) NR, and the starting rubber (C") corresponds to the (3) NR. The starting rubbers (B") and (C") are the same type so naturally are compatible.

Since the percent compositions of the starting rubbers (A"), (B"), and (C") are made the same in the first process and the second process, the temperature gradient of the tanδ of Example III-1 (Standard Example) where 21 parts by weight of (3) NR and 9 parts by weight of (7) terminal modified solution polymerized SBR are additionally charged in the second process was 2.72. On the other hand, the temperature gradient of Example III-2 (Comparative Example) where the same 30 parts by weight, but of a low Tg (3) NR was additionally charged in the second process was an improved temperature gradient of 2.62, but the breaking strength fell. However, Example III-3 (Example of Invention) wherein 5 parts by weight of the (3) NR was charged as the starting rubber (C") together with the (7) terminal modified solution polymerized SBR in the first process was improved in the temperature gradient to 2.67 and had a high breaking strength. Due to this, it is learned that by adding to the master batch mixed in the first process a small amount of a starting rubber compatible with the starting rubber additionally charged in the second process, the reduction of the breaking strength is suppressed. Further, the values of the tanδ of Example III-1 (Standard Example) at both 0° C. and 40° C. are exceeded, so it is learned that preferable features for a tire tread are provided.

TABLE III-1

| Ex. No. | III-1*[1] | *III-2*[2] | III-3*[3] |
|---|---|---|---|
| 1st process | | | |
| (3) NR | 21 | — | 5 |
| (7) SBR | 49 | 70 | 70 |
| (10) carbon black | 70 | 70 | 70 |
| (11) zinc oxide | 3 | 3 | 3 |
| (12) stearic acid | 2 | 2 | 2 |
| (13) antioxidant | 2 | 2 | 2 |
| (14) wax | 1 | 1 | 1 |
| (15) oil | 35 | 35 | 35 |
| 2nd process | | | |
| (3) NR | 9 | 30 | 25 |
| (7) SBR | 21 | — | — |
| (16) sulfur | 2.1 | 2.1 | 2.1 |
| (17) vulcanization accelerator | 0.5 | 0.5 | 0.5 |
| (18) vulcanization accelerator | 0.5 | 0.5 | 0.5 |
| Physical properties of vulcanized rubber | | | |
| Breaking strength (MPa) | 18.8 | 17.5 | 18.5 |
| tanδ 0° C. (A) | 0.74 | 0.767 | 0.77 |
| tanδ 40° C. (B) | 0.272 | 0.293 | 0.288 |
| Temperature gradient (A/B) | 2.72 | 2.62 | 2.67 |

*[1]Standard Example
*[2]Comparative Example
*[3]Example of Invention

Table III-2 shows Examples of use of the (1) solution polymerized BR and (5) solution polymerized SBR. The BR and SBR are incompatible. In Example III-5 (Example of Invention), the starting rubber (A") corresponds to the (5) solution polymerized BR, the starting rubber (B") corresponds to the (1) solution polymerized BR, and the starting rubber (C") corresponds to the (1) solution polymerized BR. The temperature gradient of the tanδ of the Example III-4 (Comparative Example) where 25 parts by weight of the high Tg (5) solution polymerized SBR was charged in the second process, the temperature gradient of the Example III-5 (Example of Invention) was 1.94 wherein 25 parts by weight of a (1) low Tg solution polymerized BR was charged was an improved 1.78.

TABLE III-2

| Ex. No. | III-4*[1] | III-5*[3] |
|---|---|---|
| 1st process | | |
| (1) BR | 30 | 5 |
| (5) SBR | 45 | 70 |
| (10) carbon black | 70 | 70 |
| (11) zinc oxide | 3 | 3 |
| (12) stearic acid | 2 | 2 |
| (13) antioxidant | 2 | 2 |
| (14) wax | 1 | 1 |
| (15) oil | 35 | 35 |
| 2nd process | | |
| (1) BR | — | 25 |
| (5) SBR | 25 | — |
| (16) sulfur | 2.1 | 2.1 |
| (17) vulcanization accelerator | 0.5 | 0.5 |
| (18) vulcanization accelerator | 0.5 | 0.5 |
| Physical properties of vulcanized rubber | | |
| Breaking strength (MPa) | 15 | 14.7 |
| tanδ 0° C. (A) | 0.701 | 0.701 |
| tanδ 40° C. (B) | 0.36 | 0.394 |
| Temperature gradient (A/B) | 1.94 | 1.78 |

*[1]Standard Example
*[3]Example of Invention

Table III-3 shows Examples of use of the (4) solution polymerized SBR and (9) terminal modified solution polymerized SBR. The (4) solution polymerized SBR and (9) terminal modified solution polymerized SBR are incompatible. In Example III-7 (Example of Invention), the starting rubber (A") corresponds to the (9) terminal modified solution polymerized SBR, the starting rubber (B") corresponds to the (4) solution polymerized SBR, and the starting rubber (C") corresponds to the (4) solution polymerized SBR. In the same way as the results of Table III-2, compared with the Example III-6 (Comparative Example) where the starting rubber charged in the second process had a high Tg, the temperature dependency of the tanδ of the Example III-7 (Example of Invention) using a low Tg was smaller and improved.

TABLE III-3

| Ex. No. | III-6*[1] | III-7*[3] |
|---|---|---|
| 1st process | | |
| (4) SBR | 35 | 10 |
| (9) SBR | 40 | 65 |
| (10) carbon black | 70 | 70 |
| (11) zinc oxide | 3 | 3 |
| (12) stearic acid | 2 | 2 |
| (13) antioxidant | 2 | 2 |
| (14) wax | 1 | 1 |
| (15) oil | 35 | 35 |
| 2nd process | | |
| (4) SBR | — | 25 |
| (9) SBR | 25 | — |
| (16) sulfur | 2.1 | 2.1 |
| (17) vulcanization accelerator | 0.5 | 0.5 |
| (18) vulcanization accelerator | 0.5 | 0.5 |

TABLE III-3-continued

| Ex. No. | III-6*1 | III-7*3 |
|---|---|---|
| Physical properties of vulcanized rubber | | |
| Breaking strength (MPa) | 16.5 | 17 |
| tanδ 0° C. (A) | 0.588 | 0.6308 |
| tanδ 40° C. (B) | 0.264 | 0.283 |
| Temperature gradient (A/B) | 2.23 | 2.15 |

*1 Standard Example
*3 Example of Invention

Table III-4 confirms the present invention by other starting rubbers. In Example III-9 (Example of Invention), the starting rubber (A") corresponds to the (8) solution polymerized BR, the starting rubber (B") corresponds to the (1) solution polymerized BR, and the starting rubber (C") corresponds to the (1) BR; in Example III-11 (Example of Invention), the starting rubber (A") corresponds to the (6) emulsion polymerized SBR, the starting rubber (B") corresponds to the (2) solution polymerized BR, and the starting rubber (C") corresponds to the (1) emulsion polymerized BR, and in Example III-13 (Example of Invention), the starting rubber (A") corresponds to the (6) emulsion polymerized SBR, the starting rubber (B") corresponds to (3) NR, and the starting rubber (C") corresponds to (3) NR. Compared with Example III-8 (Standard Example), Example III-9 (Example of Invention) was improved in the temperature gradient of the tanδ while maintaining the breaking strength. Similarly, compared with Example III-10 (Standard Example), Example III-11 (Example of Invention) was improved in temperature gradient and compared with Example III-12 (Standard Example), Example III-12 (Example of Invention) was similarly improved.

As clear from Tables III-1 to III-4, the rubber compositions of the process of production of the present invention feature a large tanδ at 0° C. and a low temperature dependency at 0° C. and 40° C. while maintaining the breaking strength. By using them for a tire tread, the feature is obtained of a strong grip on the road surface and a high level of stability even in the face of changes in the ambient temperature.

We claim:

1. A process for producing a rubber composition comprising (I) 100 parts by weight of starting rubbers (A'), (B'), and (C'), which composition includes 10 to 40 parts by weight of the starting rubber (A') which has a glass transition temperature of −40° to −15° C., 30% to 85% by weight based upon the total amount of the starting rubbers, of the starting rubber (B') which is viscoelastically incompatible with the starting rubber (A') and has a glass transition of a temperature at least 20° C. lower than the glass transition temperature of the starting rubber (A'), and 5 to 30% by weight, based upon the total amount of the starting rubbers, of the starting rubber (C') which is viscoelastically compatible with the starting rubber (A'), incompatible with the starting rubber (B'), and has a glass transition temperature equal to or less than that of the starting rubber (A'), and (ii) 30 to 60 parts by weight of a reinforcing agent, comprising the steps of:

(a) mixing the starting rubbers (B') and (C') and at least 80% by weight of the total weight of the reinforcing agent in a hermetic type mixer at 150° C. to 200° C. for at least 10 seconds;

(b) adding to the mixture resulting from step (a) the starting rubber (A') and the remaining reinforcing agent; and (c) mixing together the starting rubber (A'), the remaining reinforcing agent, and the mixture resulting from step (a).

TABLE III-4

| Ex. No. | III-8*1 | III-9*2 | III-10*1 | III-11*2 | III-12*1 | III-13*2 |
|---|---|---|---|---|---|---|
| 1st process | | | | | | |
| (1) BR | 30 | 10 | 10 | 10 | — | — |
| (2) BR | — | — | 40 | — | — | — |
| (3) NR | — | — | — | — | 30 | 10 |
| (6) SBR | — | — | 28.75 | 68.75 | 48.75 | 68.75 |
| (8) BR | 30 | 50 | — | — | — | — |
| (10) carbon black | 70 | 70 | 70 | 70 | 70 | 70 |
| (11) zinc oxide | 3 | 3 | 3 | 3 | 3 | 3 |
| (12) stearic acid | 1 | 1 | 1 | 1 | 1 | 1 |
| (13) antioxidant | 1 | 1 | 1 | 1 | 1 | 1 |
| (14) wax | 1 | 1 | 1 | 1 | 1 | 1 |
| (15) oil | 35 | 35 | 16.25 | 16.25 | 16.25 | 16.25 |
| 2nd process | | | | | | |
| (1) BR | 20 | 40 | — | — | — | — |
| (2) BR | — | — | — | 40 | — | — |
| (3) NR | — | — | — | — | 20 | 40 |
| (6) SBR | — | — | 40 | — | 20 | — |
| (8) BR | 20 | — | — | — | — | — |
| (16) sulfur | — | — | 1.8 | 1.8 | 1.8 | 1.8 |
| (18) vulcanization accelerator | — | — | 1 | 1 | 1 | 1 |
| Physical properties of vulcanized rubber | | | | | | |
| Breaking strength (MPa) | 14.0 | 14.1 | 20.3 | 20.6 | 23.6 | 23.8 |
| tanδ 0° C. (A) | 0.304 | 0.302 | 0.474 | 0.471 | 0.578 | 0.566 |
| tanδ 40° C. (B) | 0.252 | 0.265 | 0.326 | 0.336 | 0.303 | 0.316 |
| Temperature gradient (A/B) | 1.21 | 1.14 | 1.45 | 1.4 | 1.91 | 1.79 |

*1: Standard Example
*2: Example of Invention

2. A rubber composition produced by the process according to clam 1, wherein the starting rubber (A') is at least one rubber selected from the group consisting of emulsion polymerized styrene-butadiene copolymers having a styrene content of 30 to 50% by weight, and solution polymerized styrene-butadiene copolymers having a 1,2-bond butadiene content in the butadiene component having not more than 70% by weight and a styrene content of the value shown by the following formula (1'), Styrene content >40-(1,2-bond butadiene content)÷3     (1')

the starting rubber (B') is at least one rubber selected from the group consisting of natural rubbers and polyisoprene rubbers, and the starting rubber (C') is at least one rubber selected from the group consisting of emulsion polymerized styrene-butadiene copolymers having a styrene content of not more than 50% by weight and a solution polymerized styrene-butadiene copolymers having a 1,2-bond butadiene content of not more than 70% by weight and a styrene content of at least 1.5% by weight.

3. A rubber composition produced by the process according to claim 1, wherein the starting rubber (A') is at least one rubber selected from the group consisting of polybutadiene rubbers having a 1,2-bond butadiene content of at least 65% by weight and a solution polymerized styrene-butadiene copolymers having a 1,2-bond butadiene content of at least 70% by weight and a styrene content of not more than 30% by weight, the starting rubber (B') is at least one rubber selected from the group consisting of emulsion polymerized styrene-butadiene copolymers having a styrene content of not more than 35% by weight and solution polymerized styrene-butadiene copolymers having a 1,2-bond butadiene content of not more than 40% by weight and a styrene content having the value shown by the following formula (2'), Styrene content<40-(1,2-bond butadiene content)÷3     (2')

and the starting rubber (C') is at least one rubber selected from the group consisting of polybutadienes having a 1,2-bond butadiene content of at least 65%, solution polymerized styrene-butadiene copolymers having a 1,2-bond butadiene content of at least 70% by weight and a styrene content of not more than 30% by weight, natural rubbers, and polyisoprene rubbers.

4. A rubber composition produced by the process according to claim 1, wherein the starting rubber (A') is at least one rubber selected from the group consisting of polybutadienes having a 1,2-bond butadiene content of at least 65% by weight, emulsion polymerized styrene-butadiene copolymers having a styrene content of 30 to 50% by weight, solution polymerized styrene-butadiene copolymers having a 1,2-bond butadiene content of at least 70% by weight and a styrene content of not more than 30% by weight, and solution polymerized styrene-butadiene copolymers having a 1,2-bond butadiene content of not more than 70% by weight and a styrene content of the value shown by the following formula (1'), the starting rubber (B') is at least one rubber selected from the group consisting of polybutadienes having a percent by weight of cis-1,4 bonded polybutadienes in the butadiene component of the starting rubber (cis-1,4 bond butadiene content) of at least 95% by weight and a polybutadiene having a 1,2-bond butadiene content of 10 to 50% by weight, and the starting rubber (C') is at least one rubber selected from the group consisting of polybutadienes having a 1,2-bond butadiene content of at least 65% by weight, emulsion polymerized styrene-butadiene copolymers having a styrene content of not more than 50% by weight, solution polymerized styrene-butadiene copolymers having a 1,2-bond butadiene content of at least 70% by weight and a styrene content of not more than 30%, and solution polymerized styrene-butadiene copolymers having a 1,2-bond butadiene content of not more than 70% by weight and a styrene content of the value shown by the following formula (1'), Styrene content>40-(1,2-bond butadiene content)÷3.     (1').

5. A rubber composition produced by the process according to claim 1, wherein the starting rubber (A') is at least one rubber selected from the group consisting of polybutadienes having a 1,2-bond butadiene content of at least 65% by weight, the starting rubber (B') is at least one rubber selected from the group consisting of polybutadienes having a cis-1,4 bond butadiene content of at least 95% by weight and polybutadienes having a 1,2-bond butadiene content of 10 to 50% by weight, and the rubber composition (C') is at least one rubber selected from the group consisting of polybutadienes having a 1,2-bond butadiene content of at least 65% by weight, natural rubbers, and polyisoprene rubbers.

6. A rubber composition produced by the process according to claim 1, wherein at least one rubber selected from the group consisting of solution polymerized rubbers obtained by causing at least 29% by weight of the alkali metal or alkali earth metal of the synthesis terminals in the rubber molecules to react with a terminal modifying compound having a —CO—N< or —CS—N<bond in its molecule is used for at least part of the starting rubber (B').

* * * * *

UNITED STATES PATENT AND TRADEMARK OFFICE
CERTIFICATE OF CORRECTION

| | | |
|---|---|---|
| PATENT NO. | : | 5,834,552 |
| DATED | : | November 10, 1998 |
| INVENTOR(S) | : | Tetsuji KAWAZURA et al. |

It is certified that error appears in the above-indentified patent and that said Letters Patent is hereby corrected as shown below:

Title page, Item [75], Inventors: "Kaido" should read --Kaidou--.

Claim 2, Col. 33, line 20, "1.5%" should read --15%--.

Signed and Sealed this

Twenty-ninth Day of June, 1999

Attest:

Q. TODD DICKINSON

*Attesting Officer*     *Acting Commissioner of Patents and Trademarks*